(12) United States Patent
Kanzaki et al.

(10) Patent No.: US 11,745,505 B2
(45) Date of Patent: Sep. 5, 2023

(54) RECORDING APPARATUS

(71) Applicant: Brother Kogyo Kabushiki Kaisha, Nagoya (JP)

(72) Inventors: Shotaro Kanzaki, Handa (JP); Toshihiro Kishigami, Obu (JP); Atsushi Ito, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/174,659

(22) Filed: Feb. 12, 2021

(65) Prior Publication Data
US 2021/0252855 A1 Aug. 19, 2021

(30) Foreign Application Priority Data
Feb. 13, 2020 (JP) ................ 2020-022089

(51) Int. Cl.
B41J 2/045 (2006.01)
B41J 2/14 (2006.01)
B41J 2/145 (2006.01)
B41J 2/505 (2006.01)
B41J 3/01 (2006.01)
G06F 3/12 (2006.01)

(52) U.S. Cl.
CPC ....... *B41J 2/04588* (2013.01); *B41J 2/04541* (2013.01); *B41J 2/04551* (2013.01); *B41J 2/04581* (2013.01); *B41J 2/145* (2013.01); *B41J 2/505* (2013.01); *B41J 3/01* (2013.01); *G06F 3/1253* (2013.01)

(58) Field of Classification Search
CPC .................................................. B41J 2/04551
See application file for complete search history.

(56) References Cited

U.S. PATENT DOCUMENTS

| 5,488,223 | A | * | 1/1996 | Austin | G06K 15/00 347/198 |
| 2001/0043242 | A1 | * | 11/2001 | Takahashi | B41J 2/04581 347/10 |
| 2006/0044334 | A1 | * | 3/2006 | Fujita | B41J 2/04573 347/12 |
| 2008/0266608 | A1 | * | 10/2008 | Yamazaki | B41J 19/145 358/3.06 |
| 2015/0251446 | A1 | * | 9/2015 | Sayama | B41J 2/04551 347/16 |

FOREIGN PATENT DOCUMENTS

JP 2016-128957 A 7/2016

* cited by examiner

*Primary Examiner* — Shelby L Fidler

(74) *Attorney, Agent, or Firm* — Banner & Witcoff, Ltd.

(57) ABSTRACT

A recording apparatus includes a liquid ejection head having nozzles, a controller, and a signal input part through which a user inputs, to the controller, a setting signal indicating settings related to a grade of a barcode or two-dimensional code. The controller drives the liquid ejection head based on the setting signal input through the signal input part to cause the nozzles to eject liquid to record a barcode or two-dimensional code on a recording medium in the grade corresponding to the setting signal.

11 Claims, 15 Drawing Sheets

SHEET-WIDTH DIRECTION
LEFT SIDE ⇔ RIGHT SIDE
↓ CONVEYING DIRECTION

SHEET-WIDTH DIRECTION
LEFT SIDE ⟺ RIGHT SIDE
CONVEYING DIRECTION ↓

RECORDING APPARATUS

CROSS-REFERENCE TO RELATED APPLICATION

This application claims priority under 35 U.S.C. § 119 from Japanese Patent Application No. 2020-022089 filed on Feb. 13, 2020. The entire subject matter of the application is incorporated herein by reference.

BACKGROUND

Technical Field

Aspects of the present disclosures relate to a recording apparatus configured to perform recording by ejecting liquid from one or more nozzles.

Related Art

As an example of the recording apparatus configured to perform recording by ejecting liquid from one or more nozzles, there has been known a printer configured to perform recording by ejecting ink from one or more nozzles. The conventionally known printer records a test chart including a plurality of black bars recorded in different recording densities, obtains information regarding widths of the black bars of the recorded test chart, and calculates anticipated decoding difficulty levels of barcodes recorded in different recording densities by using the obtained information regarding the widths of the black bars. Then, the printer evaluates anticipated grades of barcodes recorded in different recording densities based on the calculated decoding difficulty levels and selects a recording concentration, which is to be used in recordings of barcodes, that makes the grade of recorded barcodes the highest.

SUMMARY

There may be some restrictions such as a reduction in a driving frequency of an inkjet head or a reduction in a conveying speed of a sheet in order to record barcodes to be as high grade as possible as in the conventional printer. On the other hand, there are cases where barcodes are used in situations where barcodes of low grades do not practically cause problems as long as the barcodes can be read. If barcodes are recorded in the highest possible grade even in such cases, productivity may uselessly decrease due to the above-mentioned restrictions.

According to aspects of the present disclosures, there is provided a recording apparatus including a liquid ejection head having nozzles, a controller, and a signal input part through which a user inputs, to the controller, a setting signal indicating settings related to a grade of a barcode or two-dimensional code. The controller drives the liquid ejection head based on the setting signal input through the signal input part to cause the nozzles to eject liquid to record a barcode or two-dimensional code on a recording medium in the grade corresponding to the setting signal.

BRIEF DESCRIPTION OF THE ACCOMPANYING DRAWINGS

DETAILED DESCRIPTION

First Embodiment

Hereinafter, a first embodiment of the present disclosures will be described.

Overall Configuration of Printer

Figure 1:
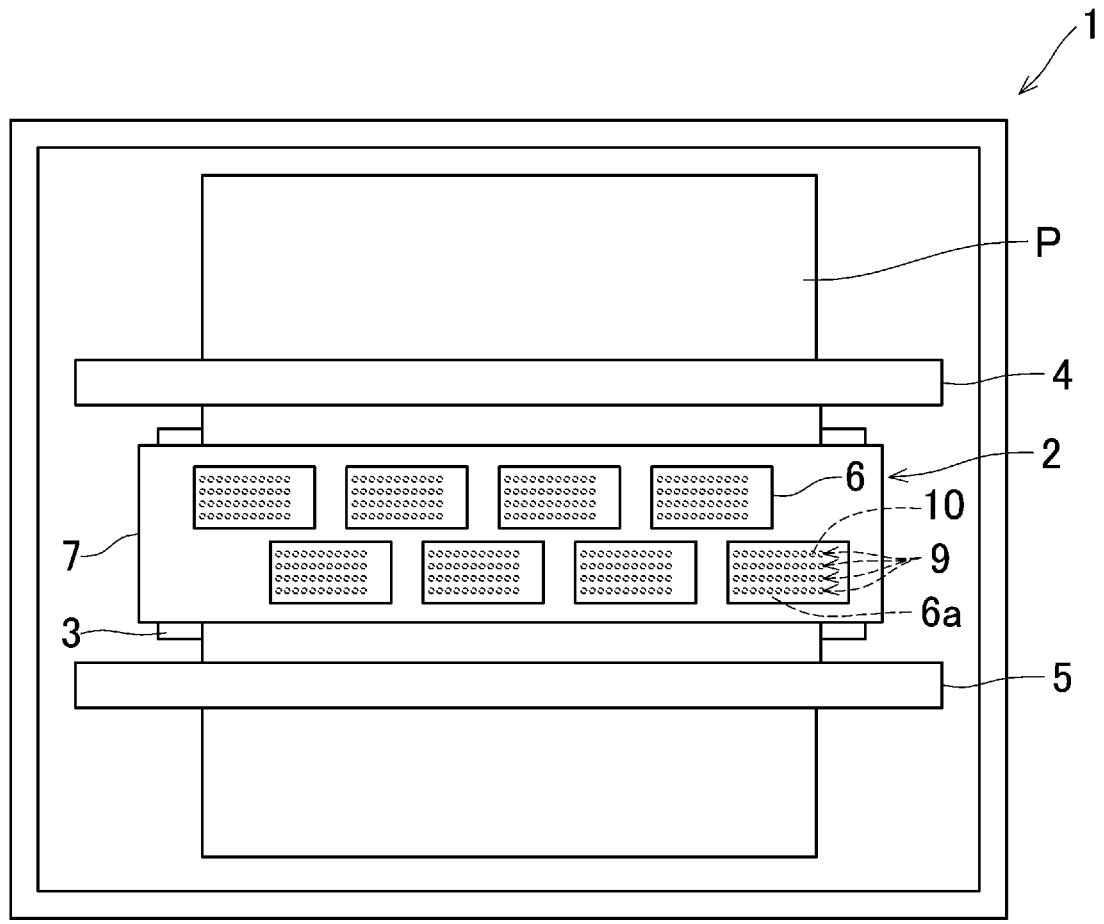
FIG. 1 is a schematic diagram of a printer according to a first embodiment of the present disclosure.

As shown in FIG. 1, a printer 1 according to the first embodiment includes an inkjet head 2, a platen 3 and conveying rollers 4 and 5. It is noted that the conveying rollers 4 and 5 are examples of a relative displacement unit according to aspects of the present disclosures.

The inkjet head 2 includes eight head units 6 and a support member 7. It is noted that the eight head units 6 are examples of a liquid ejection head according to aspects of the present disclosures. Each head unit 6 is configured to eject ink from a plurality of nozzles 10 formed on a nozzle surface 6a which is a lower surface of the head unit 6.

The plurality of nozzles 10 are arranged in a horizontal sheet-width direction at predetermined nozzle intervals to form a nozzle row 9. The head unit 6 has four nozzle rows 9 arranged in a conveying direction that is horizontal and perpendicular to the sheet-width direction. Positions of the nozzles 10 in each nozzle row 9 in the sheet-width direction are the same for all the four nozzle rows 9. The nozzles 10 configuring the first nozzle row 9, the nozzles 10 configuring the second nozzle row 9, the nozzles 10 configuring the third nozzle row 9 and the nozzles 10 configuring the fourth nozzle row 9 in an order from an upstream side to a downstream side in the conveying direction respectively eject black ink, yellow ink, cyan ink and magenta ink. Hereinafter, description will be made by defining a right side and a left side in the sheet-width direction as shown in FIG. 1.

Four of the eight head units 6 are aligned in the sheet-width direction to form a row of the head units 6, and the other four form another row of the head units 6. Thus, in the inkjet head 2, the two rows of the head units 6 each extending in the sheet-width direction are arranged in the conveying direction. Positions of the head units 6 configuring a row on the upstream side in the conveying direction and positions of the head units 6 configuring a row on the downstream side in the conveying direction are shifted with respect to each other in the sheet-width direction. Furthermore, some nozzles 10 of the head units 6 configuring the row on the upstream side in the conveying direction and some nozzles 10 of the head units 6 configuring the row on the downstream side in the conveying direction overlap in the conveying direction. The plurality of nozzles 10 of the eight head units 6 are thereby arranged across an entire length in the sheet-width direction of a recording sheet P. That is, the inkjet head 2 is a so-called line head. The support member 7 is a rectangular plate-like member whose longitudinal direction is parallel to the sheet-width direction and holds the eight head units 6 in the positional relationship described above. It is noted that the recording sheet P is an example of a recording medium according to aspects of the present disclosures.

The platen 3 is disposed below the inkjet head 2. The platen 3 extends across the entire length of the inkjet head 2 in the sheet-width direction. The platen 3 supports the recording sheet P onto which recording is in progress.

Figure 4:
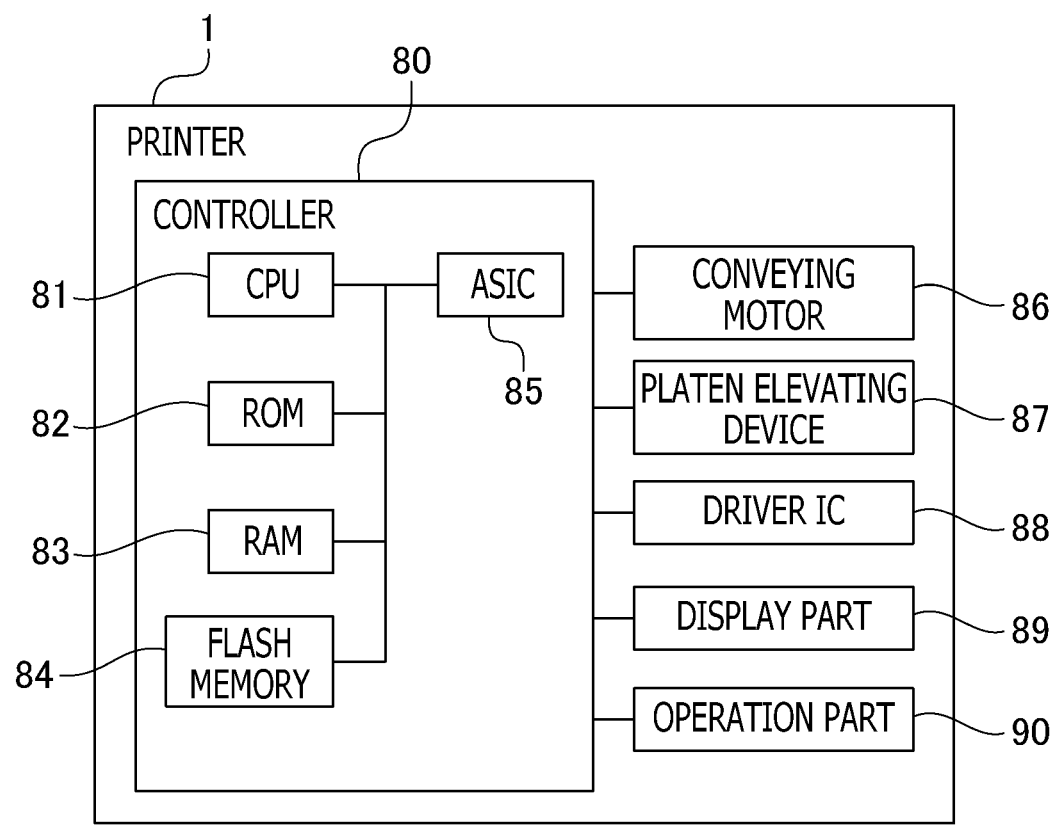
FIG. 4 is a block diagram showing an electrical configuration of the printer according to the first embodiment of the present disclosure.

The platen 3 is configured to be movable up and down by a platen elevating device 87 (See FIG. 4.). As the platen 3 moves up and down, a gap between the recording sheet P on the platen 3 and the nozzle surface 6a changes. It is noted that the platen elevating device 87 is an example of a gap changing unit according to aspects of the present disclosures. In the first embodiment, the platen elevating device 87 moves the platen 3 up and down to selectively position the platen 3 at one of a first position and a second position lower than the first position. For example, in a state where the platen 3 is positioned at the first position, the gap between an upper surface of the platen 3 and the nozzle surface 6a is about 0.5-1.5 mm, and, in a state where the platen 3 is positioned at the second position, the gap between the upper surface of the platen 3 and the nozzle surface 6a is about 1.5-2.5 mm.

The conveying roller 4 is disposed on the upstream side in the conveying direction with respect to the inkjet head 2 and the platen 3. The conveying roller 5 is disposed on the downstream side in the conveying direction with respect to the inkjet head 2 and the platen 3. The conveying rollers 4 and 5 are connected to a conveying motor 86 (See FIG. 4.) via conventionally known gears or the like. As the conveying motor 86 is driven, the conveying rollers 4 and 5 rotate and the recording sheet P is conveyed in the conveying direction. The inkjet head 2 and the recording sheet P thereby relatively displace in the conveying direction.

The printer 1 can record an image on the recording sheet P by ejecting ink toward the recording sheet P from the plurality of nozzles 10 of the eight head units 6 configuring the inkjet head 2 while conveying the recording sheet P in the conveying direction with the conveying rollers 4 and 5.

Head Unit

Figure 2:
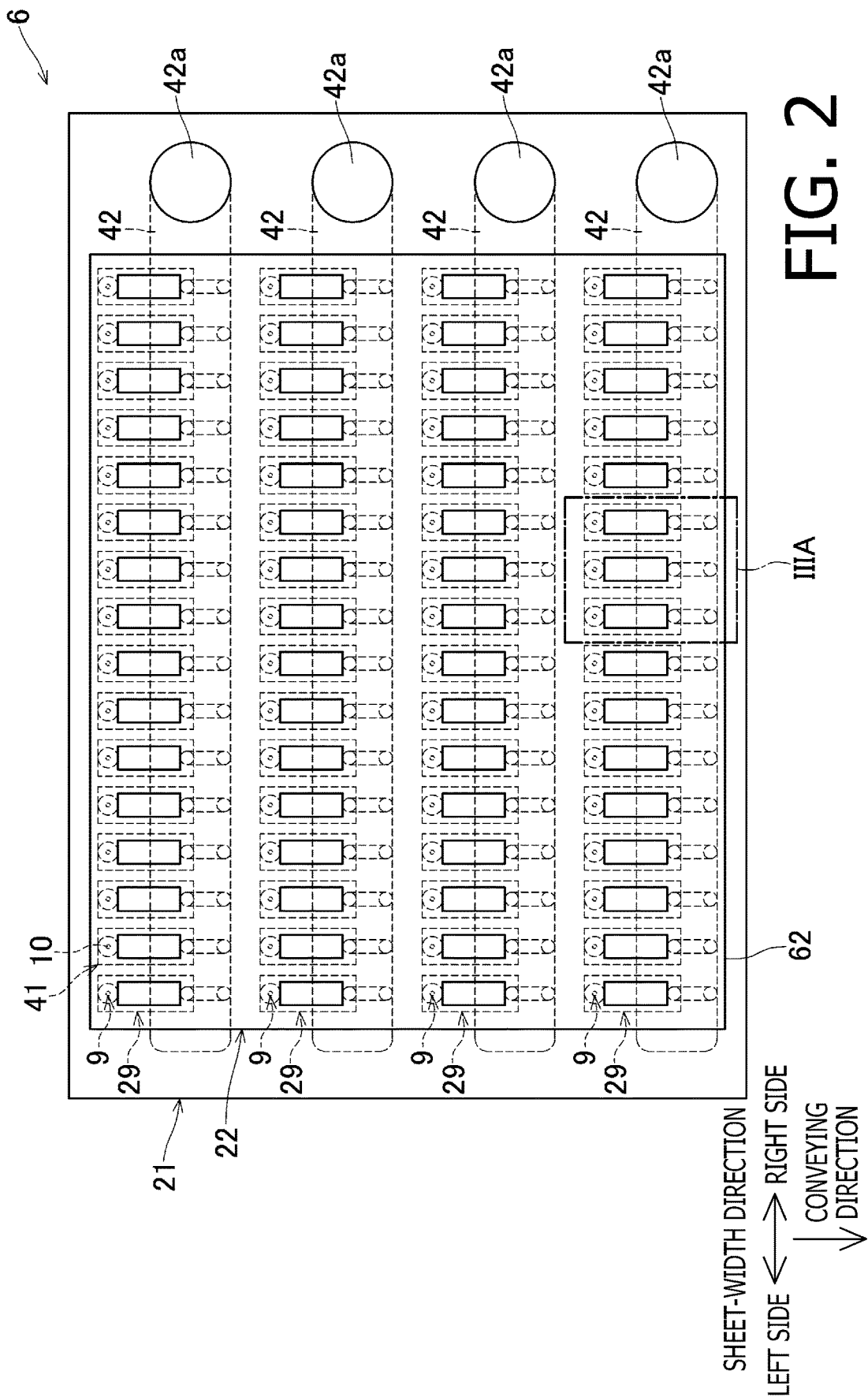
FIG. 2 is a plan view of a head unit of an inkjet head shown in FIG. 1.
Figure 3A:
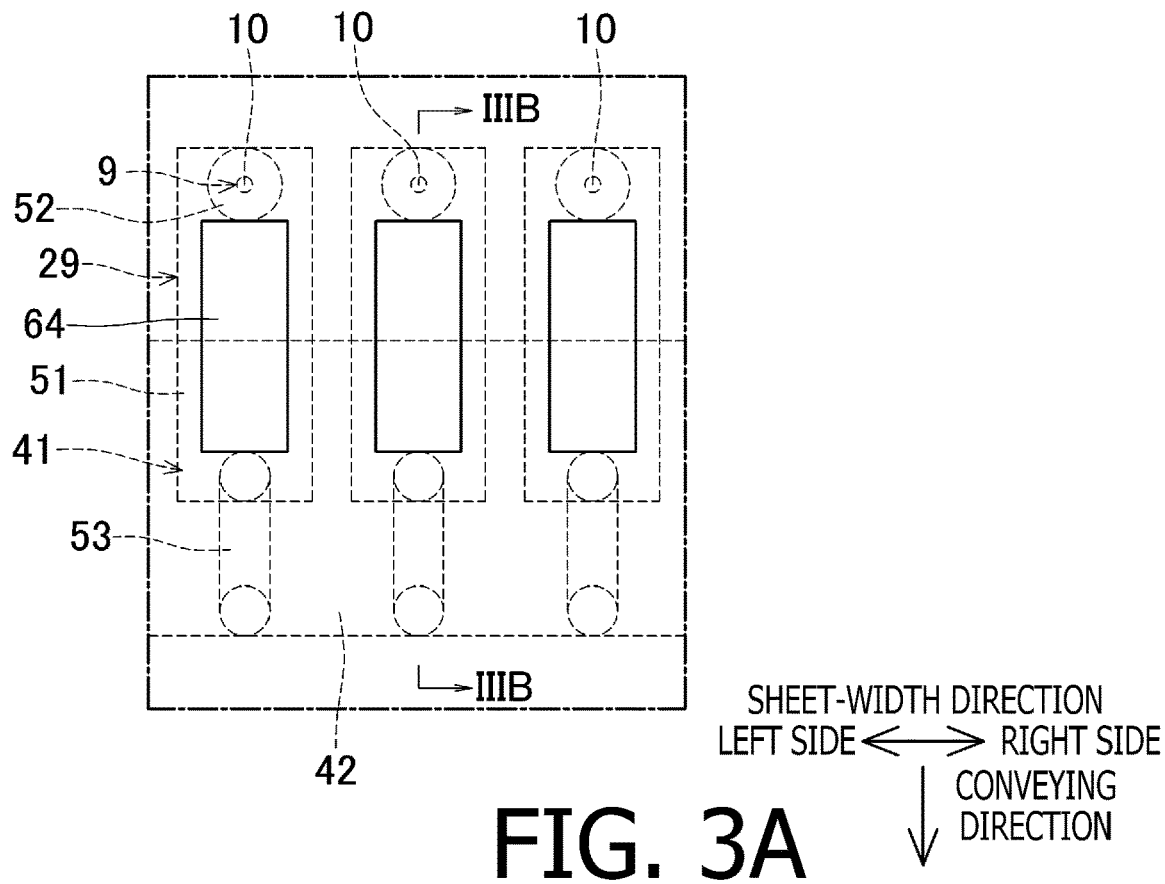
FIG. 3A is an enlarged view of a portion of the head unit surrounded by a chain line IIIA shown in FIG. 2
Figure 3B:
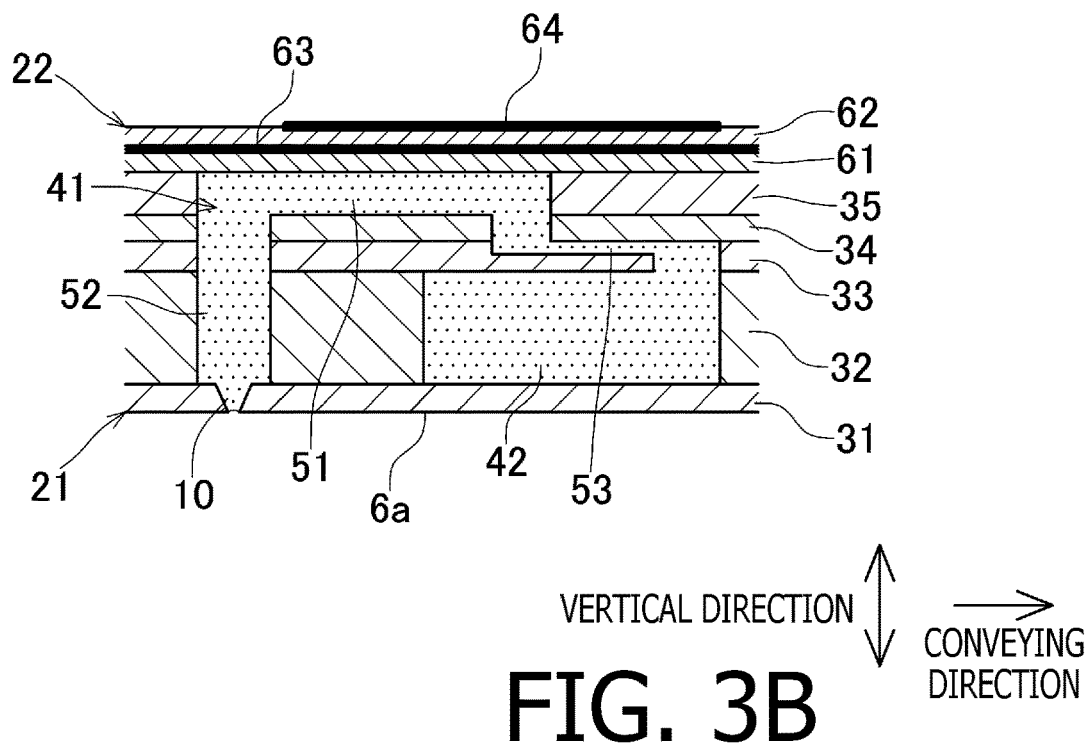
FIG. 3B is a cross sectional view of the head unit cut along a line IIIB-IIIB shown in FIG. 3A.

Next, a structure of the head unit 6 will be described in detail. As shown in FIGS. 2, 3A and 3B, the head unit 6 includes a flow path unit 21 and a piezoelectric actuator 22.

The flow path unit 21 is formed by layering plates 31 to 35 in this order vertically from bottom up. The flow path unit 21 includes a plurality of individual flow paths 41 each including the nozzle 10, and four common flow paths 42.

The plurality of individual flow paths 41 are arranged in the sheet-width direction to form individual flow path rows 29. In relation to the plurality of nozzles 10 forming four nozzle rows 9 as described above, the flow path unit 21 includes four individual flow path rows 29.

The four common flow paths 42 correspond to the four individual flow path rows 29. The four common flow paths 42 extend in the sheet-width direction and are connected to the plurality of individual flow paths 41 configuring the corresponding individual flow path rows 29. Ink is supplied to each common flow path row 42 through an ink supply port 42a provided at a right end portion in the sheet-width direction.

Each individual flow path 41 includes the nozzle 10, a pressure chamber 51, a descender 52 and a throttle flow path 53. The nozzle 10 and an end portion of the pressure chamber 51 on the upstream side in the conveying direction are connected by the descender 52, and the throttle flow path 53 is connected to an end portion of the pressure chamber 51 on the downstream side in the conveying direction. An end of the throttle flow path 53 on the downstream side in the conveying direction of each individual flow path 41 is connected to the corresponding common flow path 42. A more detailed description of the structures and the positional relationships of the nozzle 10, the pressure chamber 51, the descender 52 and the throttle flow path 53 are herein omitted as they are like the conventional ones.

The piezoelectric actuator 22 includes a vibration plate 61, a piezoelectric layer 62, a common electrode 63 and a plurality of individual electrodes 64. The vibration plate 61 is formed of a piezoelectric material composed mainly of lead zirconate titanate being mixed crystal of lead titanate and lead zirconate. The vibration plate 61 is disposed on an upper surface of the flow path unit 21 (i.e., on an upper surface of the plate 35) and covers a plurality of pressure chambers 51. The piezoelectric layer 62 is formed of the above-described piezoelectric material. The piezoelectric layer 62 is disposed on an upper surface of the vibration plate 61 and extends continuously across the plurality of pressure chambers 51. It should be noted that, although the vibration plate 61 and the piezoelectric layer 62 of the first embodiment are formed of the piezoelectric material, the vibration plate 61 may be formed of an insulating material other than the piezoelectric material such as, for example, synthetic resin.

The common electrode 63 is disposed between and extends across the vibration plate 61 and the piezoelectric layer 62. The common electrode 63 is connected to a conventionally known power source via a conventionally known wiring and is held at a ground potential. The plurality of individual electrodes 64 are disposed on an upper surface of the piezoelectric layer 62. The plurality of individual electrodes 64 correspond to the plurality of pressure chambers 51, respectively, and overlap with central parts of the corresponding pressure chambers 51 in the vertical direction. Each of the plurality of individual electrodes 64 is connected to a driver IC 88 (See FIG. 4.) via a conventionally known wiring. Driving voltage is applied to each individual electrode 64 by outputting a driving waveform signal being a pulse signal from the driver IC 88 to each individual electrode 64. Since the common electrode 63 and the plurality of individual electrodes 64 are disposed as described above, portions of the piezoelectric layer 62 nipped between the common electrode 63 and the individual electrodes 64 are respectively polarized in their thickness directions.

With the piezoelectric actuator 22, it is possible to change pressure of ink within the pressure chamber 51 to eject ink from the nozzle 10 in communication with the pressure chamber 51 by outputting the driving waveform signal from the driver IC 88 to the individual electrode 64 to change a potential difference between the individual electrode 64 and the common electrode 63 to thereby cause portions of the piezoelectric layer 62 and the vibration plate 61 overlapping with the pressure chamber 51 in the vertical direction to deform.

Electrical Configuration of Printer

Next, an electrical configuration of the printer 1 will be described. As shown in FIG. 4, the printer 1 includes a controller 80 and operations of the printer 1 are controlled by the controller 80. The controller 80 includes a CPU (Central Processing Unit) 81, a ROM (Read Only Memory) 82, a RAM (Random Access Memory) 83, a flash memory 84, an ASIC (Application Specific Integrated Circuit) 85 and the like and controls operations of the conveying motor 86, the platen elevating device 87, the driver IC 88 and the like.

Apart from the above-described components, the printer 1 includes a display part 89 and an operation part 90. The display part 89 is, for example, a display provided to a chassis of the printer 1 and displays, under control of the controller 80, screens necessary for the operation of the printer 1 such as a setting screen 70 (See FIG. 6.) which will be described later.

The operation part 90 is buttons provided to the chassis of the printer 1, a touch panel provided to the display part 89 or the like. As a user operates the operation part 90, the operation part 90 generates a signal corresponding to the user's operation and inputs the generated signal to the controller 80. It is noted that the operation part 90 is an example of a signal input part according to aspects of the present disclosures.

The controller 80 may be configured such that the CPU 81 and the ASIC 85 independently execute processes or such that the CPU 81 and the ASIC 85 cooperate to execute processes. The controller 80 may include only one CPU 81 and the only one CPU 81 may independently execute processes, or the controller 80 may include a plurality of CPUs 81 and the plurality of CPUs 81 may share processes. The controller 80 may include only one ASIC 85 and the only one ASIC 85 may independently execute processes, or the controller 80 may include a plurality of ASICs 85 and the plurality of ASICs 85 may share processes.

Control for Recording Bar Code or Two-Dimensional Code

Figure 5:
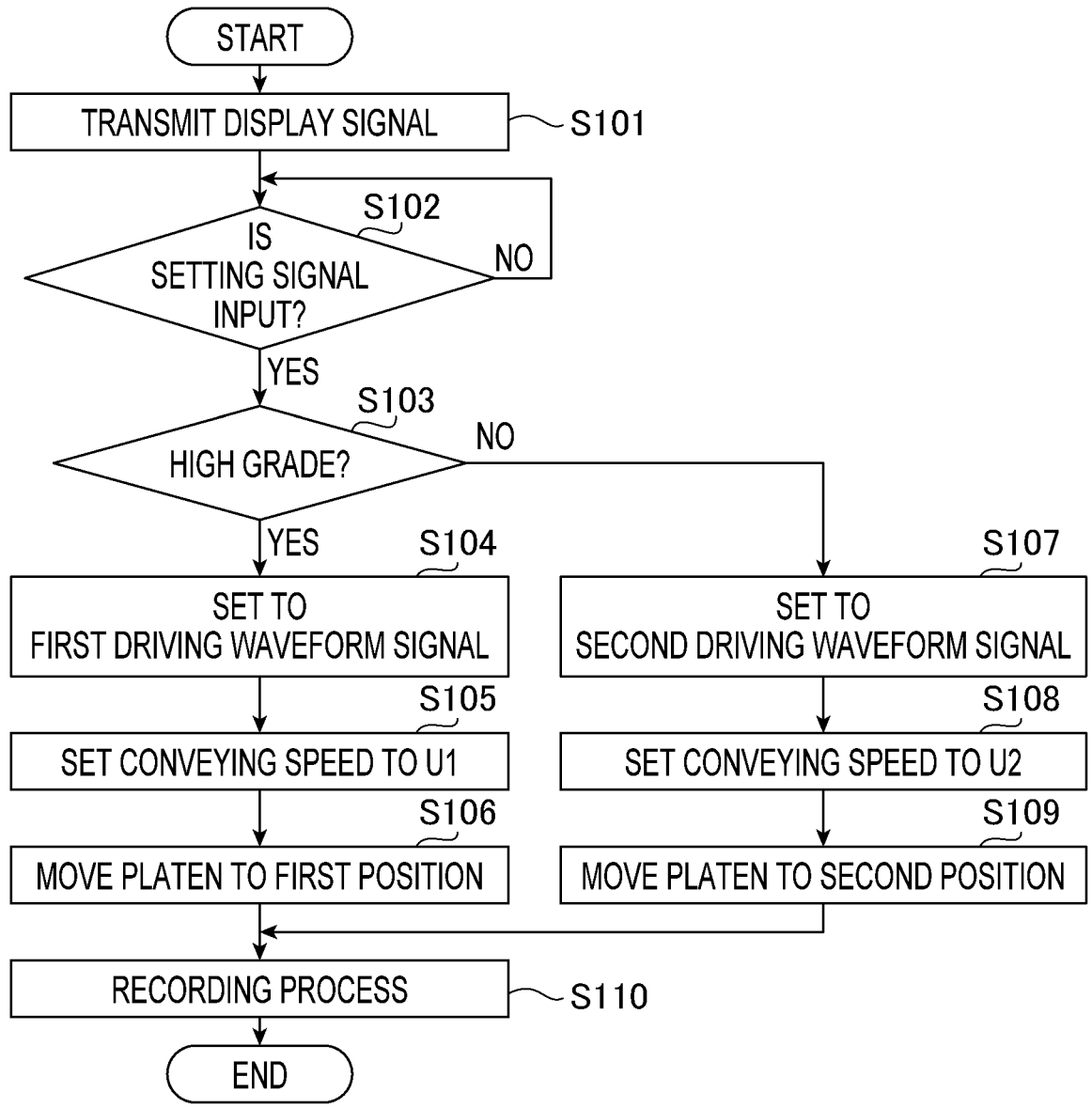
FIG. 5 is a flowchart showing a flow of processes to be executed by the printer according to the first embodiment of the present disclosure when recording a barcode or two-dimensional code.

When a recording command instructing to execute recording of a barcode or two-dimensional code is input, the printer 1 executes recording of the barcode or two-dimensional code on the recording sheet P by the controller 80 executing processes in accordance with a flow shown in FIG. 5.

Figure 6:
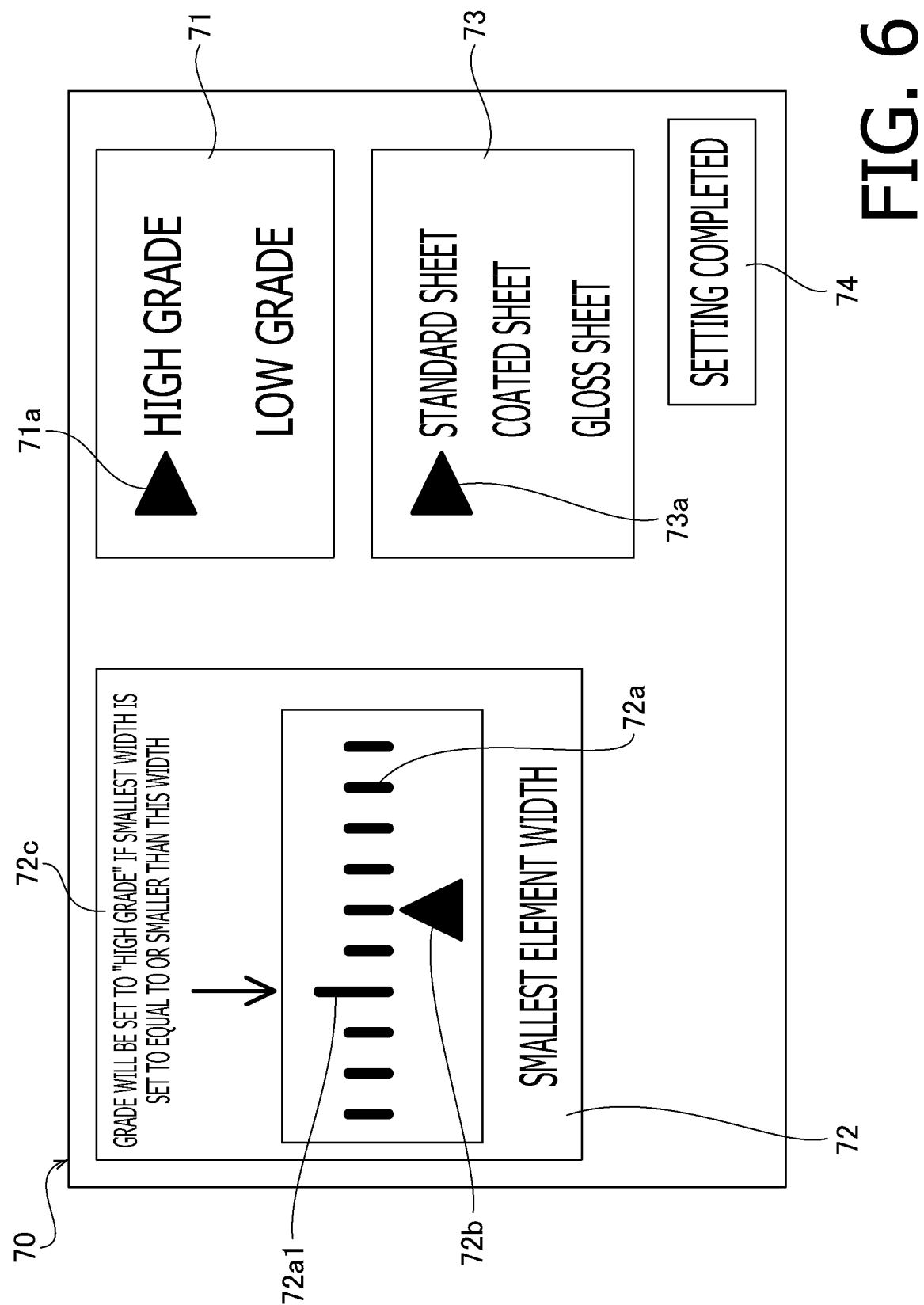
FIG. 6 is a diagram illustrating a setting screen for setting a grade of a barcode or two-dimensional code.

When the recording command instructing to execute recording of a barcode or two-dimensional code is input, the controller 80 firstly transmits, to the display part 89, a display signal for displaying a setting screen 70 such as the one shown in FIG. 6 (S101). As shown in FIG. 6, the setting screen 70 includes a grade setting part 71, a smallest width setting part 72, a sheet type setting part 73 and a setting completion button 74. It is noted that the grade setting part 71 is an example of a grade display part according to aspects of the present disclosures, and the smallest width setting part 72 is an example of a setting display part according to aspects of the present disclosures.

The grade setting part 71 is for setting a grade of a barcode or two-dimensional code to be recorded. The grade of a barcode or two-dimensional code indicates a degree of reading accuracy of the barcode or two-dimensional code by a reader which is defined in regulations such as JISX0520, ISO/IEC 15416, and ANSI X3.182. The higher the grade of a barcode or two-dimensional code is, the higher the reading accuracy of the barcode or two-dimensional code by a reader is.

In the grade setting part 71, a cursor 71a points a currently-selected grade (i.e., a "high grade" or a "low grade" shown in FIG. 6). A user can change the setting of the grade by operating the operating part 90 to move the cursor 71a. The "high grade" shown in FIG. 6 indicates grades, among a plurality of grades defined in a regulation, with which the reading accuracy by a reader becomes equal to or higher than a predetermined accuracy. The "low grade" shown in FIG. 6 indicates grades, among the plurality of grades defined in the regulation, with which the reading accuracy by a reader becomes lower than the predetermined accuracy. The smallest width setting part 72 is for setting a smallest width of elements of a barcode or two-dimensional code. The elements of a barcode are bars configuring the barcode, and the elements of a two-dimensional code are cells configuring the two-dimensional code. The smallest width setting part 72 includes a plurality of scale marks 72a arranged in a lateral direction of FIG. 6. The scale marks 72a indicate the above-described smallest width. A cursor 72b points a currently-selected smallest width. A user can change the setting of the smallest width by operating the operating part 90 to move the cursor 72b. In FIG. 6, the more on the left the scale mark 72a is, the smaller the smallest width the scale mark 72a indicates. In FIG. 6, among the plurality of scale marks 72a, a scale mark 72a1 being longer than the other scale marks 72a indicates a width (e.g., about 215 μm) that is slightly smaller than a smallest width (e.g., about 254 μm) of the elements that is defined in a regulation of a barcode or two-dimensional code. The grade of a barcode or two-dimensional code becomes the highest and the reading accuracy by a reader becomes the highest when the barcode or two-dimensional code is recorded with the smallest width of the elements that is equal to or smaller than the width indicated by the scale mark 72a1.

Correlation information indicating correlation between the above-described smallest widths and the grades of a barcode or two-dimensional code is stored in the flash memory 84. It is noted that the flash memory 84 is an example of a storage according to aspects of the present disclosures. The cursor 71a of the grade setting part 71 and the cursor 72b of the smallest width setting part 72 are linked based on this correlation information and thus when one of the cursors 71a and 72b are moved, the other of the cursors 71*a* and 72*b* also moves. That is, in the setting screen 70, information concerning the grade displayed in the grade setting part 71 and information concerning the setting of the smallest width displayed in the smallest width setting part 72 are linked based on the correlation information.

For example, when the cursor 71*a* is moved to a position pointing the "high grade," the cursor 72*b* moves to a position pointing one of the scale mark 72*a*1 and the scale marks 72*a* on the left side of the scale mark 72*a*1. On the other hand, when the cursor 71*a* is moved to a position pointing the "low grade," the cursor 72*b* moves to a position pointing one of the scale marks 72*a* on the right side of the scale mark 72*a*1.

Similarly, when the cursor 72*b* is moved to a position pointing one of the scale mark 72*a*1 and the scale marks 72*a* on the left side of the scale mark 72*a*1, the cursor 71*a* moves to the position pointing the "high grade." On the other hand, when the cursor 72*b* is moved to a position pointing one of the scale marks 72*a* on the right side of the scale mark 72*a*1, the cursor 71*a* moves to the position pointing the "low grade."

Since the smallest width setting part 72 simply displays the setting of the smallest width when the cursor 71*a* is operated, the smallest width setting part 72 may also be referred to as a setting display part. Similarly, since the grade setting part 71 simply displays the setting of the grade when the cursor 72*b* is operated, the grade setting part 71 may also be referred to as a grade display part.

In connection with the above-described configuration, the smallest width setting part 72 displays a massage 72*c*. The message 72*c* notifies a user that the grade will be set to the "high grade" if the smallest width is set to a width that is equal to or smaller than a width indicated by the scale mark 72*a*1. That is, the message 72*c* is for notifying a user of a setting for making the grade a predetermined grade which is, in the present embodiment, the "high grade." It is noted that the massage 72*c* is an example of a notifying part according to aspects of the present disclosures.

A user can set the grade of a barcode or two-dimensional code to be recorded by operating the operation part 90 based on the contents of the setting screen 70 to perform one of the direct setting of the grade through the grade setting part 71 and the setting of the smallest width through the smallest width setting part 72.

The sheet type setting part 73 is for setting a type of the recording sheet P. In the sheet type setting part 73, a cursor 73*a* points a currently-selected setting of the type of the recording sheet P (a "standard sheet," a "coated sheet" or a "gloss sheet" shown in FIG. 6). A user can change the setting of the type of the recording sheet P by operating the operation part 90 to move the cursor 73*a*.

The setting completion button 74 is a button for completing a setting for recording a barcode or two-dimensional code. As a user operates the operation part 90 to press the setting completion button 74, a signal of setting information indicating the setting being set through the setting screen 70 is transmitted to the controller 80.

Referring back to FIG. 5, after S101, the controller 80 stands by until the signal of setting information is input (S102: NO), and when the signal of setting information is input (S102: YES), the controller 80 determines whether the input signal indicates the "high grade" or not (S103).

If the input signal indicates the "high grade" (S103: YES), the controller 80 sets the driving waveform signal for the recording to a first driving waveform signal (S104). The first driving waveform signal may consist of only one driving waveform signal or may be, for example, a set of a plurality of types of driving waveform signals unique to respective ink droplet volumes if the head unit 6 is capable of selectively ejecting ink droplets of one of a plurality of volumes from the nozzles 10.

Then, the controller 80 sets a conveying speed of the recording sheet P to U1 (S105). Specifically, the controller 80 sets a rotation speed of the conveying motor 86 such that the conveying speed of the recording sheet P by the conveying rollers 4 and 5 becomes U1 (e.g., 50 to 150 mm/sec).

Then, the controller 80 controls the platen elevating device 87 to move the platen 3 to the first position (S106). It should be noted that the processes S104 to S106 may be executed in orders different from the one shown in FIG. 5 or may be executed in parallel.

On the other hand, if the input signal indicates the "low grade" (S103: NO), the controller 80 sets the driving waveform signal for the recording to a second driving waveform signal (S107). As with the first driving waveform signal, the second driving waveform signal may consist of only one driving waveform signal or may be a set of a plurality of types of driving waveform signals unique to respective ink droplet volumes.

In the first embodiment, the first driving waveform signal and the second driving waveform signal are set and stored in the flash memory 84 in advance such that, in a case where the second driving waveform signal is transmitted to the individual electrode 64, an ejection speed of ink from the nozzle 10 becomes faster and a volume of an ink droplet ejected from the nozzle 10 becomes greater than in a case where the first driving waveform signal is transmitted to the individual electrode 64.

Then, the controller 80 sets the conveying speed of the recording sheet P to U2 being faster than U1 (S108). In other words, the controller 80 sets the rotation speed of the conveying motor 86 such that the conveying speed of the recording sheet P by the conveying rollers 4 and 5 becomes U2 (e.g., 150 to 250 mm/sec).

Then, the controller 80 controls the platen elevating device 87 to move the platen 3 to the second position (S109). It should be noted that the processes of S107 to S109 may be executed in orders different from the one shown in FIG. 5 or may be executed in parallel.

After completion of the processes of S104 to S106 or the processes of S107 to S109, the controller 80 executes a recording process (S110). In the recording process of S110, the controller 80 controls the conveying motor 86 to cause the conveying rollers 4 and 5 to convey the recording sheet P at the conveying speed set at S105 or S108 and, at the same time, controls the driver IC 88 to output the driving waveform signal set at S104 or S107 to the individual electrodes 64 based on image data of a barcode or two-dimensional code input along with the recording command to eject ink from the plurality of nozzles 10 of each head unit 6. A barcode or two-dimensional code is thereby recorded on the recording sheet P. An amount of ink to be ejected for recording each component of a barcode or two-dimensional code is changed in accordance with the type of the recording sheet P set through the sheet type setting part 73 of the setting screen 70. For example, in a case where the recording sheet P is a standard sheet over which dropped ink easily spread, the amount of ink to be ejected for recording each component of a barcode or two-dimensional code is made fewer than in a case where the recording sheet P is a coated sheet or a gloss sheet over which ink does not easily spread.

Effects of First Embodiment

In the first embodiment, the printer 1 allows a user to input a setting signal for setting the grade of a barcode or two-dimensional code through operation of the operation part 90. Then, the printer 1 records a barcode or two-dimensional code in a grade corresponding to the setting signal by driving the head unit 6 in a driving waveform corresponding to the input setting signal to eject ink from the nozzles 10. The printer 1 can thereby record a barcode or two-dimensional code in a grade a user desires.

The ejection speed of ink from the nozzle 10 and the volume of an ink droplet ejected from the nozzle 10 are restricted by the grade of a barcode or two-dimensional code. For example, the higher the grade of a barcode or two-dimensional code to be recorded, the slower the ejection speed of the ink from the nozzle 10 needs to be and the smaller the volume of an ink droplet ejected from the nozzle 10 needs to be.

In view of the above-mentioned circumstance, in the first embodiment, since the ejection speed of ink from the nozzle 10 and the volume of an ink droplet ejected from the nozzle 10 changes in accordance with the driving waveform signal for driving the head unit 6, when a user is desiring a barcode or two-dimensional code of a high grade and a setting signal indicating the "high grade" is input, the head unit 6 is driven using the first driving waveform signal which makes the ejection speed of ink from the nozzle 10 slow and which makes the volume of an ink droplet ejected from the nozzle 10 small. In addition, in accordance with the slow ejection speed of ink from the nozzle 10, the conveying speed of the recording sheet P by the conveying rollers 4 and 5 is set to U1. With this configuration, although productivity of the printer 1 decreases to a certain extent, it is possible to record barcodes or two-dimensional codes of high grades.

On the other hand, when a user is not desiring a barcode or two-dimensional code of a high grade and a setting signal indicating the "low grade" is input, the head unit 6 is driven using the second driving waveform signal which makes the ejection speed of ink from the nozzle 10 fast and which makes the volume of an ink droplet ejected from the nozzle 10 large. In addition, in accordance with the fast ejection speed of ink from the nozzle 10, the conveying speed of the recording sheet P by the conveying rollers 4 and 5 is set to U2 that is faster than U1. With this configuration, it is possible to improve productivity of the printer 1 by reducing time necessary to record a barcode or two-dimensional code with the printer 1.

If a gap between the nozzle surface 6a and the recording sheet P on the platen 3 is the same, the faster the conveying speed of the recording sheet P by the conveying rollers 4 and 5, the more likely the recording sheet P scrapes against the nozzle surface 6a. On the other hand, the smaller the above-mentioned gap, the higher an accuracy of a droplet landing position of ink ejected from the nozzle 10 on the recording sheet P.

Therefore, in the first embodiment, when the conveying speed of the recording sheet P by the conveying rollers 4 and 5 is set to U1, the platen 3 is positioned at the first position, and when the conveying speed of the recording sheet P by the conveying rollers 4 and 5 is set to U2, the platen 3 is positioned at the second position that is farther from the nozzle surface 6a than the first position. That is, the faster the conveying speed of the recording sheet P by the conveying roller 4 and 5, the larger the gap between the nozzle surface 6a and the recording sheet P on the platen 3 is set.

With this configuration, it is possible to prevent the recording sheet P from scraping against the nozzle surface 6a. Furthermore, when a user is desiring a barcode or two-dimensional code of a high grade and a setting signal indicating the "high grade" is input, the accuracy of the droplet landing position of ink on the recording sheet P improves and thus it becomes possible to record a barcode or two-dimensional code in a high grade.

In the first embodiment, the setting screen 70 displayed on the display part 89 includes the grade setting part 71 for displaying the grade of a barcode or two-dimensional code and for allowing a user to perform the setting of the grade, and the smallest width setting part 72 for displaying the smallest width of elements of a barcode or two-dimensional code and for allowing a user to perform the setting of the smallest width. Furthermore, the setting of the grade at the grade setting part 71 (i.e., the cursor 71a) and the setting of the smallest width at the smallest width setting part 72 (i.e., the cursor 72b) are linked. By such configuration, a user can perform these settings while confirming information concerning the smallest width and information concerning the grade by looking at the setting screen 70.

Since an ink droplet that landed on the recording sheet P blurs, widths of elements of a barcode or two-dimensional code recorded on the recording sheet P becomes slightly larger than set widths. Therefore, in the first embodiment, the message 72c notifying a user that the grade will be set to the "high grade" if the smallest width of elements of a barcode or two-dimensional code is set to a width that is smaller than the smallest width defined by a regulation of a barcode or two-dimensional code (i.e., a width that is equal to or smaller than the width indicated by the scale mark 72c shown in FIG. 6) is displayed on the setting screen 70. By this configuration, a user can appropriately set the smallest width of elements of a barcode or two-dimensional code based on the content of the message 72c.

Second Embodiment

Next, the second embodiment of the present disclosures will be described.

Configuration of Printer

Figure 7A:
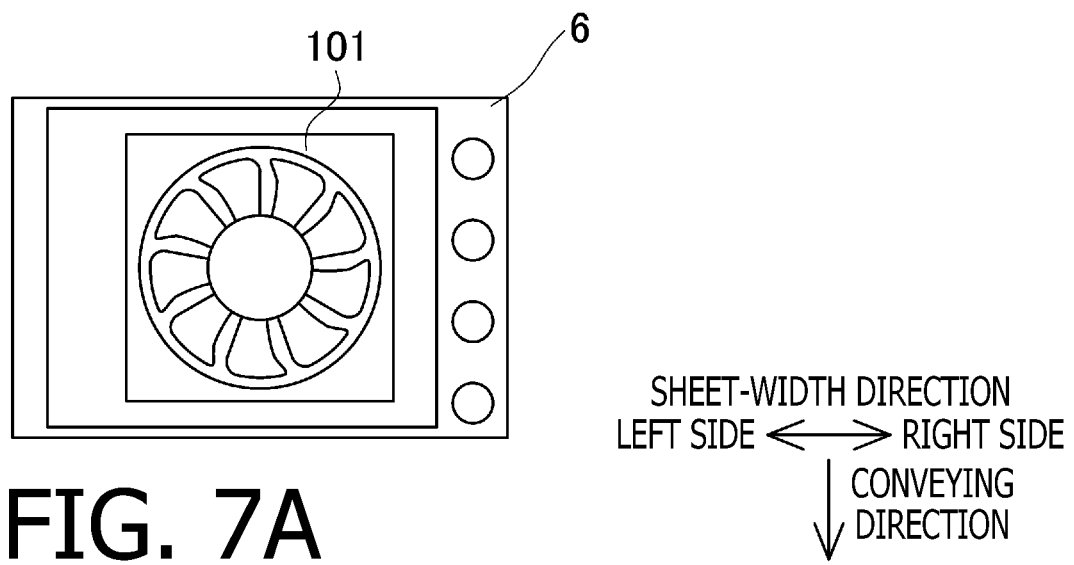
FIG. 7A is a diagram showing a structure of a head unit according to a second embodiment of the present disclosure and FIG. 7B is a block diagram showing an electrical configuration of a printer according to the second embodiment of the present disclosure.
Figure 7B:
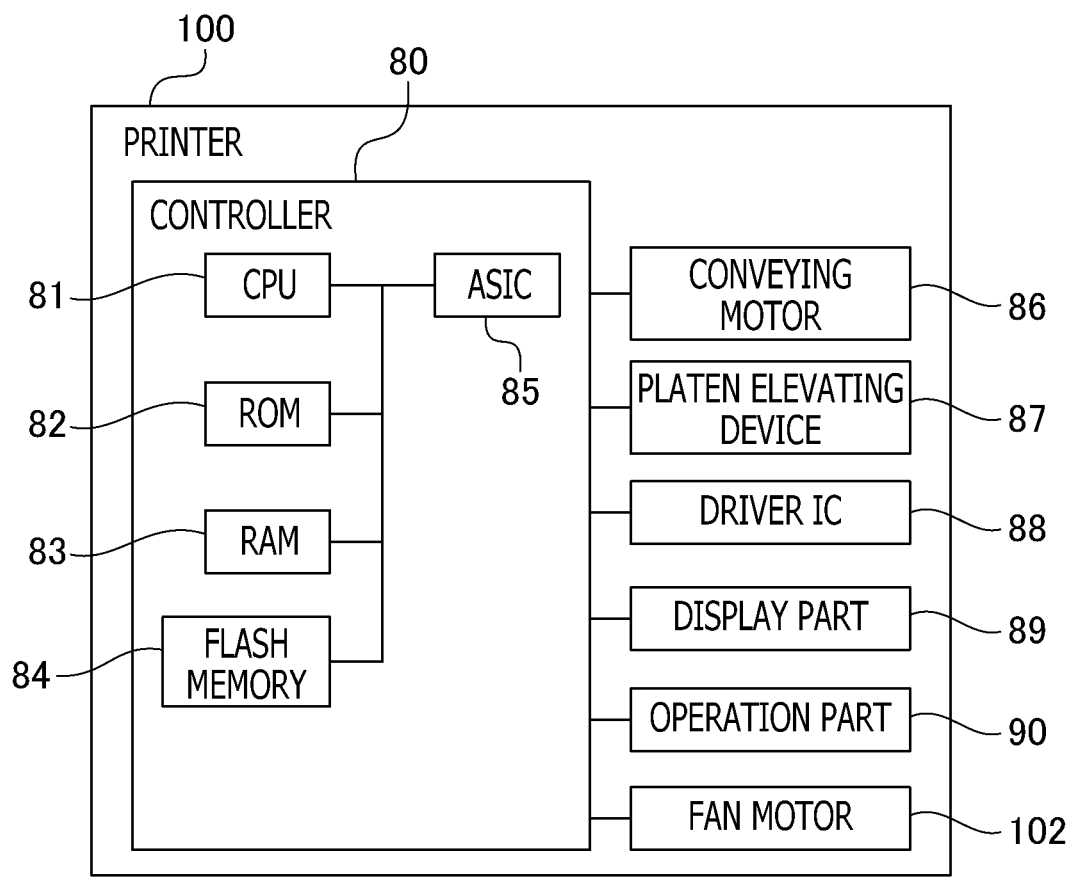

As shown in FIGS. 7A and 7B, a printer 100 according to the second embodiment is provided with a cooling fan 101 on an upper surface of each head unit 6. The cooling fan 101 is connected to a fan motor 102 and, as the fan motor 102 is driven, the cooling fan 101 rotates and the head unit 6 is cooled down.

In the second embodiment, the cooling fan 101 is provided to each head unit 6. However, one cooling fan may be provided for every two or more head units 6, or only one cooling fan may be provided for all the head units 6.

Control for Recording Bar Code or Two-Dimensional Code

Figure 8:
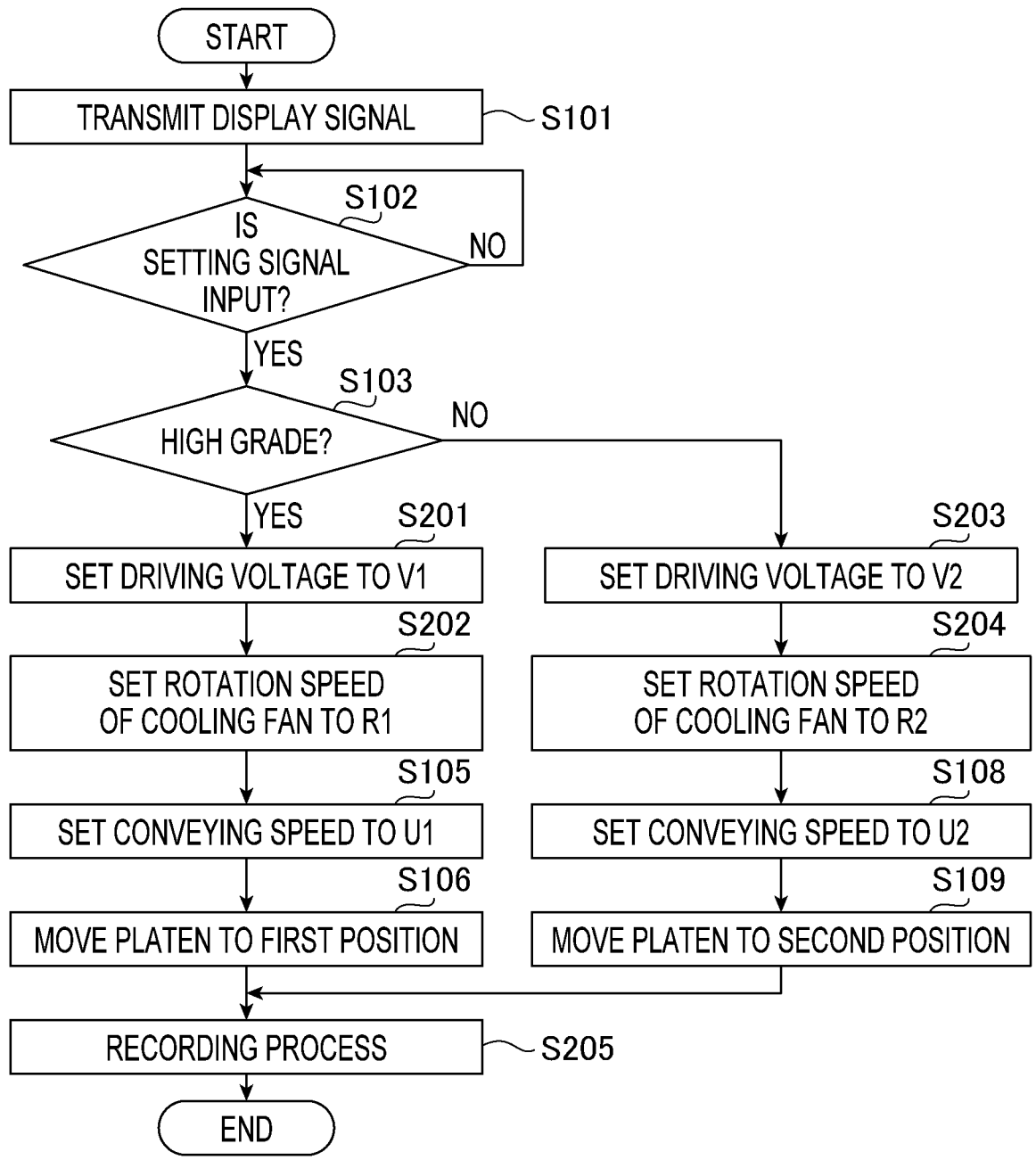
FIG. 8 is a flowchart showing a flow of processes to be executed by the printer according to the second embodiment of the present disclosure when recording a barcode or two-dimensional code.

In the printer 100, upon input of a recording command instructing to execute recording of a barcode or two-dimensional code, the controller 80 executes processes in accordance with a flow shown in FIG. 8.

When the recording command instructing to execute recording of a barcode or two-dimensional code is input, similarly to the first embodiment, the controller 80 executes the processes of S101 to S103.

Then, if the signal indicating the "high grade" is input (S103: YES), the controller 80 sets a driving voltage for the recording to V1 (e.g., 20 to 30V) (S201). In accordance with this setting, the controller 80 sets a rotation speed of the cooling fan 101 to R1 (S202). In other words, the controller 80 sets a rotation speed of the fan motor 102 such that the rotation speed of the cooling fan 101 becomes R1 (e.g., 1500 to 2500 rpm). Furthermore, as with the first embodiment, the controller 80 sets the conveying speed of the recording sheet P to U1 (S105) and controls the platen elevating device 87 to move the platen 3 to the first position (S106). It should be noted that the processes of S201, S202, S105 and S106 may be executed in orders different from the one shown in FIG. 8 or may be executed in parallel.

On the other hand, if the signal indicating the "low grade" is input (S103: NO), the controller 80 sets the driving voltage for the recording to V2 being higher than V1 (e.g., 30 to 40V) (S203). In accordance with this setting, the controller 80 sets the rotation speed of the cooling fan 101 to R2 (e.g., 2500 to 3500 rpm) being faster than R1 (S204). In other words, the controller 80 sets the rotation speed of the fan motor 102 such that the rotation speed of the cooling fan 101 becomes R2. Furthermore, as with the first embodiment, the controller 80 sets the conveying speed of the recording sheet P to U2 (S108) and controls the platen elevating device 87 to move the platen 3 to the second position (S109). It should be noted that the processes of S203, S204, S108 and S109 may be executed in orders different from the one shown in FIG. 8 or may be executed in parallel.

After completion of the processes of S201, S202, S105 and S106 or the processes of S203, S204, S108 and S109, the controller 80 executes a recording process (S205). In the recording process of S205, the controller 80 controls the conveying motor 86 to cause the conveying rollers 4 and 5 to convey the recording sheet P at the conveying speed set at S105 or S108 and, at the same time, controls the driver IC 88 to apply the driving voltage set at S201 or S203 to the individual electrodes 64 based on image data of a barcode or two-dimensional code input along with the recording command to eject ink from the plurality of nozzles 10 of each head unit 6. The controller 80 further controls the fan motor 102 to cause the cooling fan 101 to rotate at the rotation speed set at S202 or S204.

Effects of Second Embodiment

In the second embodiment, when a user is desiring a barcode or two-dimensional code of a high grade and a setting signal indicating the "high grade" is input, the head unit 6 is driven by applying the driving voltage V1 to make the ejection speed of ink from the nozzle 10 slow and to make the volume of an ink droplet ejected from the nozzle 10 small. In addition, in accordance with the slow ejection speed of ink from the nozzle 10, the conveying speed of the recording sheet P by the conveying rollers 4 and 5 is set to U1. With this configuration, although productivity of the printer 100 decreases to a certain extent, it is possible to record barcodes or two-dimensional codes of high grades.

On the other hand, when a user is not desiring a barcode or two-dimensional code of a high grade and a setting signal indicating the "low grade" is input, the head unit 6 is driven by applying the driving voltage V2 being higher than V1 to make the ejection speed of ink from the nozzle 10 fast and to make the volume of an ink droplet ejected from the nozzle 10 large. In addition, in accordance with the fast ejection speed of ink from the nozzle 10, the conveying speed of the recording sheet P by the conveying rollers 4 and 5 is set to U2 that is faster than U1. With this configuration, it is possible to improve productivity of the printer 100 by reducing time necessary to record a barcode or two-dimensional code with the printer 100.

The higher the driving voltage of the head unit 6, the higher a temperature of the head unit 6 becomes. Therefore, in the second embodiment, the rotation speed of the cooling fan 101 is set to R1 when driving the head unit 6 at the driving voltage V1, and the rotation speed of the cooling fan 101 is set to R2 being faster than R1 when driving the head unit 6 at the driving voltage V2 being higher than V1. That is, the higher the driving voltage of the head unit 6, the faster the rotation speed of the cooling fan 101 is made. With this configuration, the rotation speed of the cooling fan 101 can be made faster when the temperature of the head unit 6 is likely to get high to effectively cool the head unit 6. On the other hand, when the temperature of the head unit 6 is not high, the rotation speed of the cooling fan 101 can be made slower to suppress power consumption, to suppress noise occurring due to the rotation of the cooling fan 101, and to suppress vibration of the printer 100 due to the rotation of the cooling fan 101.

Third Embodiment

Next, the third embodiment of the present disclosures will be described.

Configuration of Printer

Figure 9A:
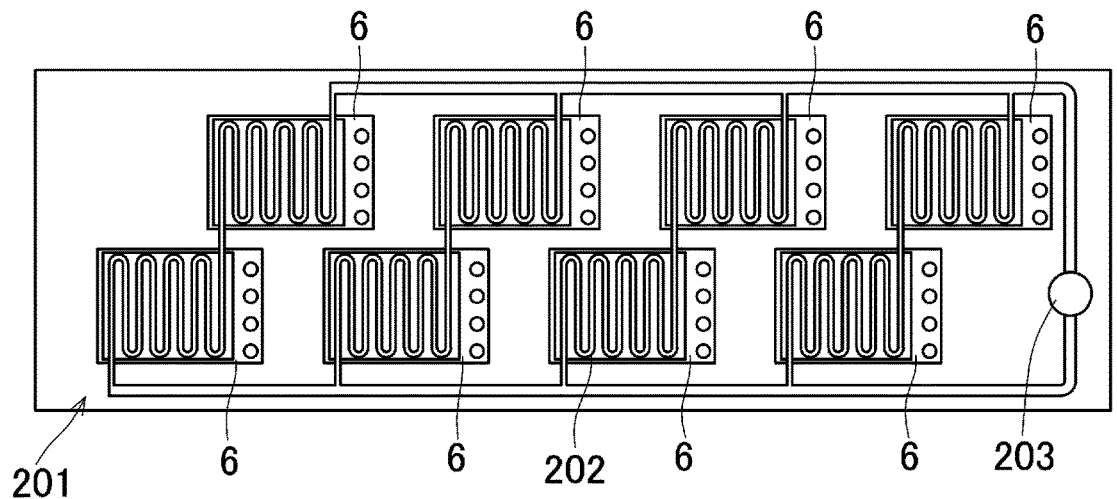
FIG. 9A is a schematic diagram of an inkjet head according to a third embodiment of the present disclosure and FIG. 9B is a block diagram showing an electrical configuration of a printer according to the third embodiment of the present disclosure.
Figure 9B:
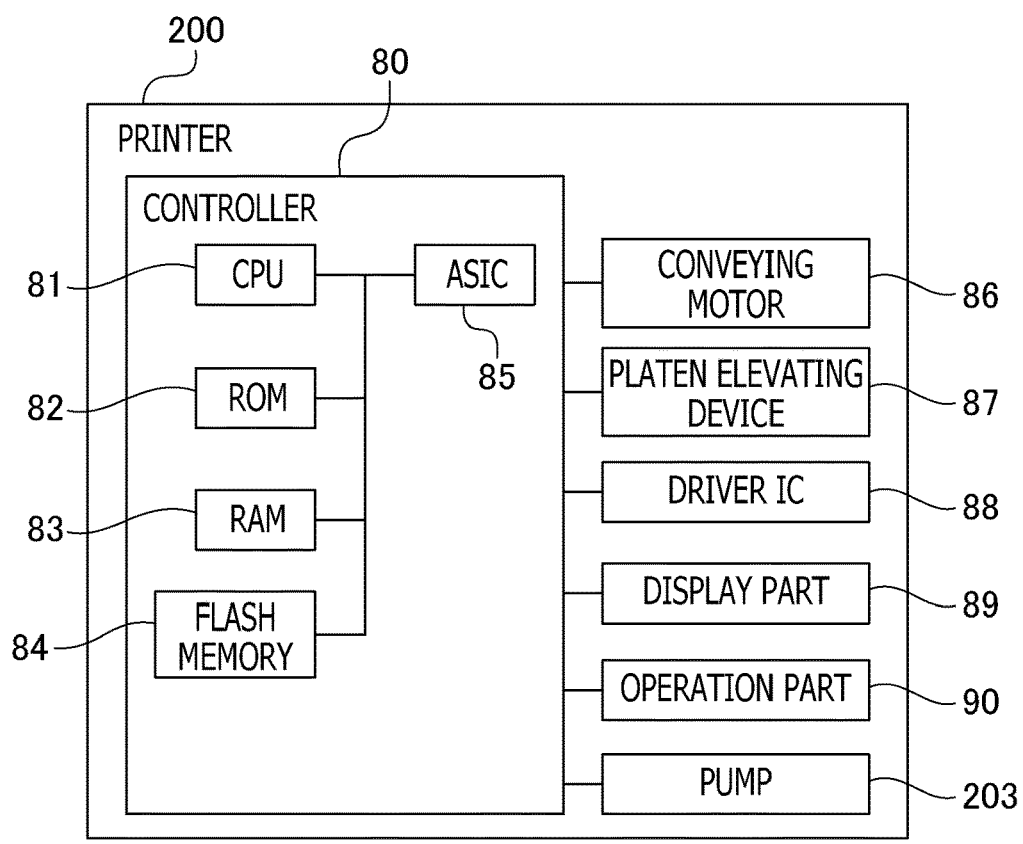

As shown in FIGS. 9A and 9B, in a printer 200 according to the third embodiment, an inkjet head 201 includes a cooling flow path 202 and a pump 203.

For example, the cooling flow path 202 is formed of a tube made from synthetic resin or the like and is drawn across the eight head units 6 such that the tube covers upper surfaces of the eight head units 6. The cooling flow path 202 is filled with cooling liquid such as water. The pump 203 is connected to the cooling flow path 202 and the liquid inside the cooling flow path flows as the pump 203 is driven. The head units 6 are cooled down by conduction of heat generated at the head units 6 to the fluid flowing inside the cooling flow path 202.

In the third embodiment, one pump 203 is provided for the cooling flow path 202 being drawn across all the eight head units 6. However, one cooling flow path may be provided for every two or more head units 6 and the pump may be provided to each of the cooling flow paths, or one cooling flow path and one pump may be provided to each of the head units 6.

Control for Recording Bar Code or Two-Dimensional Code

Figure 10:
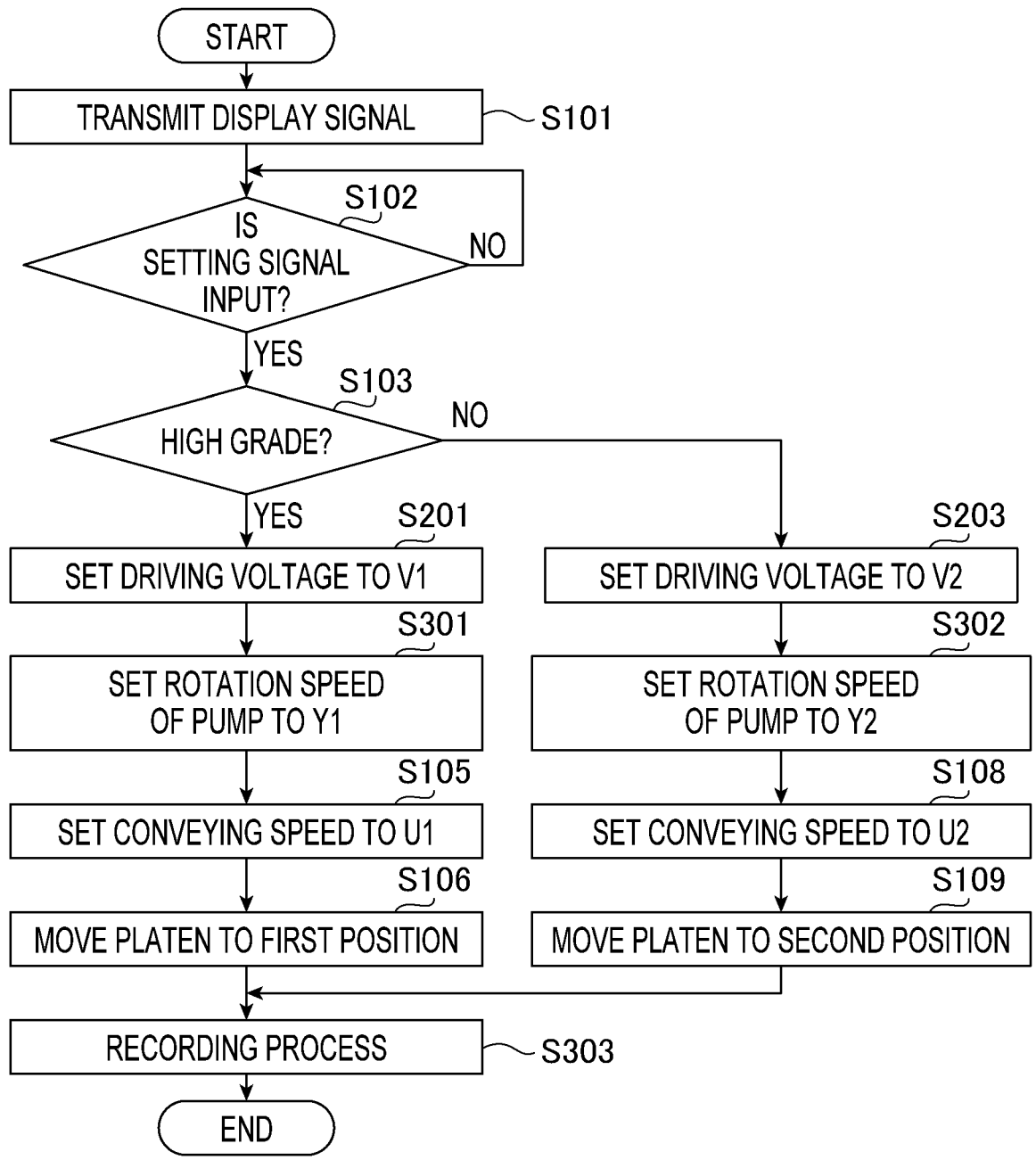
FIG. 10 is a flowchart showing a flow of processes to be executed by the printer according to the third embodiment of the present disclosure when recording a barcode or two-dimensional code.

In the printer 200, upon input of a recording command instructing to execute recording of a barcode or two-dimensional code, the controller 80 executes processes in accordance with a flow shown in FIG. 10.

When the recording command instructing to execute recording of a barcode or two-dimensional code is input, as with the first and second embodiments, the controller 80 executes the processes of S101 to S103.

Then, if the signal indicating the "high grade" is input (S103: YES), as with the second embodiment, the controller 80 sets the driving voltage for the recording to V1 (e.g., 20 to 30V) (S201). In accordance with this setting, the controller 80 sets a rotation speed of the pump 203 to Y1 (e.g., 200 to 300 rpm) (S301). In other words, the controller 80 sets a rotation speed of the fan motor 102 such that the rotation speed of the cooling fan 101 becomes R1 (e.g., 1500 to 2500 rpm). Furthermore, as with the first and second embodiments, the controller 80 sets the conveying speed of the recording sheet P to U1 (S105) and controls the platen elevating device 87 to move the platen 3 to the first position (S106). It should be noted that the processes of S201, S301, S105 and S106 may be executed in orders different from the one shown in FIG. 10 or may be executed in parallel.

On the other hand, if the signal indicating the "low grade" is input (S103: NO), as with the second embodiment, the controller 80 sets the driving voltage for the recording to V2 being higher than V1 (e.g., 30 to 40V) (S203). In accordance with this setting, the controller 80 sets the rotation speed of the pump 203 to Y2 (e.g., 400 to 500 rpm) being faster than Y1 (S302). Furthermore, as with the first and second embodiments, the controller 80 sets the conveying speed of the recording sheet P to U2 (S108) and controls the platen elevating device 87 to move the platen 3 to the second position (S109). It should be noted that the processes of S203, S302, S108 and S109 may be executed in orders different from the one shown in FIG. 10 or may be executed in parallel.

After completion of the processes of S201, S301, S105 and S106 or the processes of S203, S302, S108 and S109, the controller 80 executes a recording process (S303). In the recording process of S303, as with the second embodiment, the controller 80 controls the conveying motor 86 to cause the conveying rollers 4 and 5 to convey the recording sheet P at the conveying speed set at S105 or S108 and, at the same time, controls the driver IC 88 to apply the driving voltage set at S201 or S203 to the individual electrodes 64 based on image data of a barcode or two-dimensional code input along with the recording command to eject ink from the plurality of nozzles 10 of each head unit 6. In the recording process of S303, the controller 80 further causes the pump 203 to rotate at the rotation speed set at S301 or S302.

Effects of Third Embodiment

The higher the driving voltage of the head unit 6, the higher a temperature of the head unit 6 becomes. Therefore, in the third embodiment, the rotation speed of the pump 203 is set to Y1 when driving the head unit 6 at the driving voltage V1, and the rotation speed of the pump 203 is set to Y2 being faster than Y1 when driving the head unit 6 at the driving voltage V2 being higher than V1. That is, the higher the driving voltage of the head unit 6, the faster the rotation speed of the pump 203 is made. With this configuration, the rotation speed of the pump 203 can be made faster to make a flow rate of the fluid flowing inside the cooling flow path 202 faster when the temperature of the head unit 6 is likely to get high to effectively cool the head unit 6. On the other hand, when the temperature of the head unit 6 is not high, the rotation speed of the pump 203 can be made slower to make the flow rate of the fluid flowing inside the cooling flow path 202 slower to suppress power consumption, to suppress noise occurring due to the rotation of the pump 203, and to suppress vibration of the printer 100 due to the rotation of the pump 203.

Fourth Embodiment

Next the fourth embodiment of the present disclosures will be described.

The fourth embodiment concerns the printer 1 identical to that of the first embodiment. However, in the fourth embodiment, unlike the first embodiment, the controller 80 executes processes in accordance with a flow shown in FIG. 11 when recording a barcode or two-dimensional code.

Figure 11:
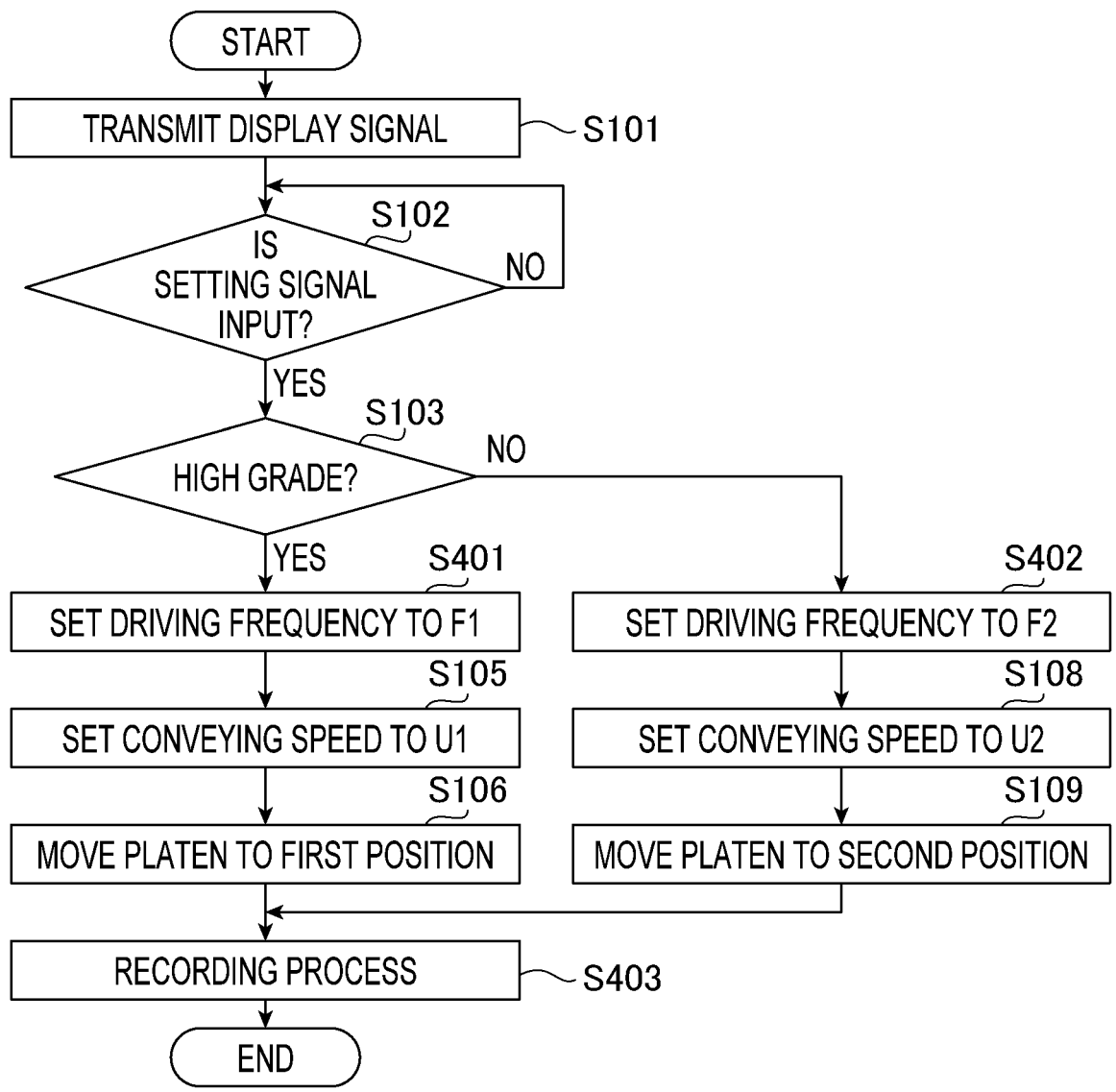
FIG. 11 is a flowchart showing a flow of processes to be executed by the printer according to a fourth embodiment of the present disclosure when recording a barcode or two-dimensional code.

As shown in FIG. 11, upon input of a recording command instructing to execute recording of a barcode or two-dimensional code, similarly to the first embodiment, the controller 80 executes the processes of S101 to S103.

Then, if the signal indicating the "high grade" is input (S103: YES), the controller 80 sets a driving frequency of the recording heads 6 for the recording to F1 (e.g., 5 to 15 kHz) (S401). Furthermore, as with the first and second embodiments, the controller 80 sets the conveying speed of the recording sheet P to U1 (S105) and controls the platen elevating device 87 to move the platen 3 to the first position (S106). It should be noted that the processes of S401, S105 and S106 may be executed in orders different from the one shown in FIG. 11 or may be executed in parallel.

On the other hand, if the signal indicating the "low grade" is input (S103: NO), the controller 80 sets the driving frequency for the recording to F2 being higher than F1 (e.g., 15 to 25 kHz) (S402). Furthermore, as with the first embodiment, the controller 80 sets the conveying speed of the recording sheet P to U2 (S108) and controls the platen elevating device 87 to move the platen 3 to the second position (S109). It should be noted that the processes of S401, S108 and S109 may be executed in orders different from the one shown in FIG. 11 or may be executed in parallel.

After completion of the processes of S401, S105 and S106 or the processes of S402, S108 and S109, the controller 80 executes a recording process (S403). In the recording process of S403, the controller 80 controls the conveying motor 86 to cause the conveying rollers 4 and 5 to convey the recording sheet P at the conveying speed set at S105 or S108 and, at the same time, controls the driver IC 88 to output a driving waveform signal in the driving frequency set at S401 or S402 to the individual electrodes 64 based on image data of a barcode or two-dimensional code input along with the recording command to eject ink from the plurality of nozzles 10 of each head unit 6.

Effects of Fourth Embodiment

An acceptable degree of variability of the ejection speed of ink from the nozzles 10 during recording and an acceptable degree of variability of the volume of ink droplet ejected from the nozzles 10 vary depending on the grade of a barcode or two-dimensional code. For example, the higher the grade of a barcode or two-dimensional code to be recorded, the smaller the acceptable degrees of the above-mentioned variabilities become. In this regard, the higher the driving frequency for driving the head unit 6, the greater the variability of the ejection speed of ink from the nozzles 10 and the variability of the volume of ink droplet ejected from the nozzles 10 become.

Therefore, in the fourth embodiment, when a user is desiring a barcode or two-dimensional code of a high grade and a setting signal indicating the "high grade" is input, the head unit 6 is driven at the low driving frequency F1. In addition, in accordance with the low driving frequency of the head unit 6, the conveying speed of the recording sheet P by the conveying rollers 4 and 5 is set to U1. With this configuration, although productivity of the printer 1 decreases to a certain extent, it is possible to record barcodes or two-dimensional codes of high grades.

On the other hand, when a user is not desiring a barcode or two-dimensional code of a high grade and a setting signal indicating the "low grade" is input, the head unit 6 is driven at the driving frequency F2 being higher than F1. In addition, in accordance with the high driving frequency of the head unit 6, the conveying speed of the recording sheet P by the conveying rollers 4 and 5 is set to U2 that is faster than U1. With this configuration, it is possible to improve productivity of the printer 1 by reducing time necessary to record a barcode or two-dimensional code with the printer 1.

Furthermore, in the fourth embodiment, when the conveying speed of the recording sheet P by the conveying rollers 4 and 5 is set to U1, the platen 3 is positioned at the first position, and when the conveying speed of the recording sheet P by the conveying rollers 4 and 5 is set to U2, the platen 3 is positioned at the second position that is farther from the nozzle surface 6a than the first position. With this configuration, it is possible to prevent the recording sheet P from scraping against the nozzle surface 6a. Furthermore, when a user is desiring a barcode or two-dimensional code of a high grade and a setting signal indicating the "high grade" is input, the accuracy of the droplet landing position of ink on the recording sheet P improves and thus it becomes possible to record a barcode or two-dimensional code in a high grade.

Fifth Embodiment

Next, the fifth embodiment of the present disclosures will be described.

Configuration of Printer

Figure 12:
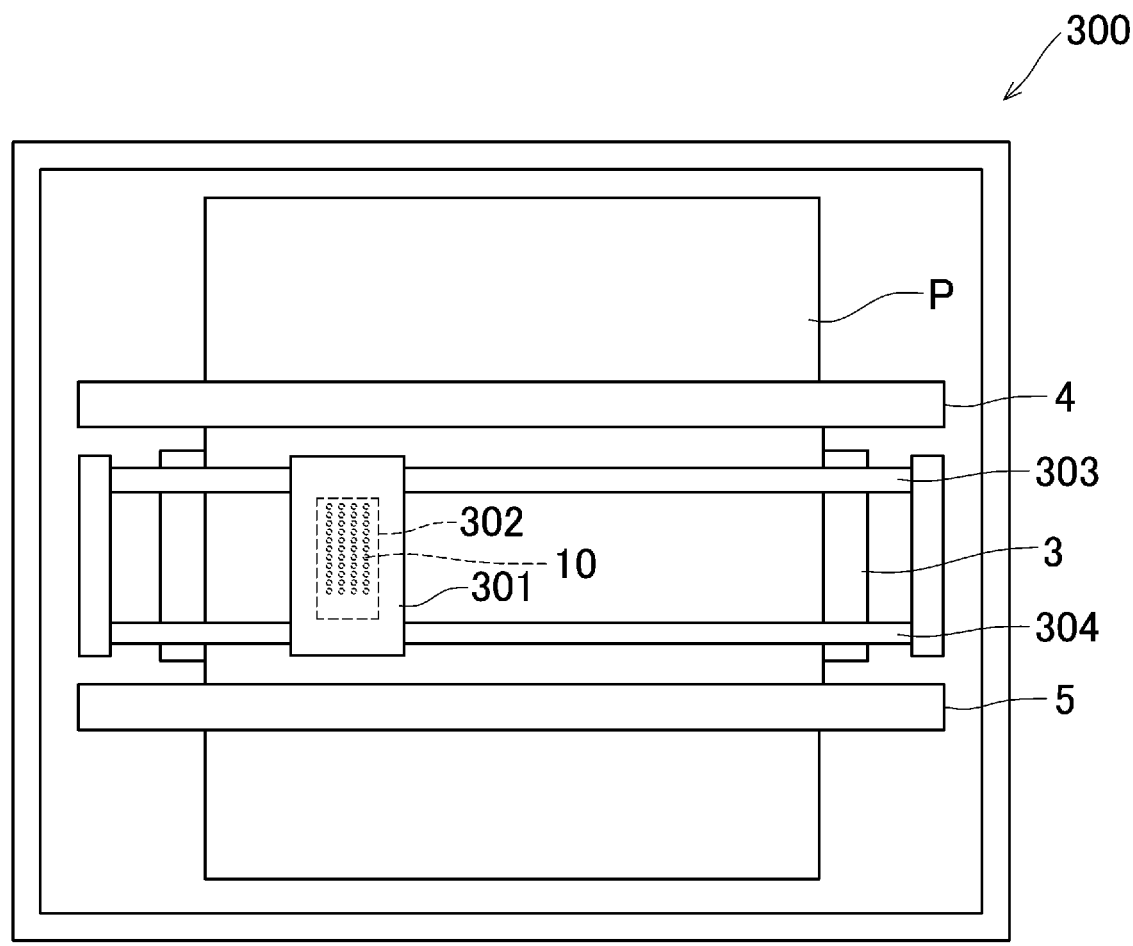
FIG. 12 is a schematic diagram of a printer according to a fifth embodiment of the present disclosure.

As shown in FIG. 12, a printer 300 according to the fifth embodiment includes a carriage 301, an inkjet head 302, and the platen 3 and conveying rollers 4 and 5 similar to those of the printer 1 according to the first embodiment. It is noted that the carriage 301 is an example of the relative displacement unit according to aspects of the present disclosures, and the inkjet head 302 is an example of the liquid ejection head according to aspects of the present disclosures.

Figure 13:
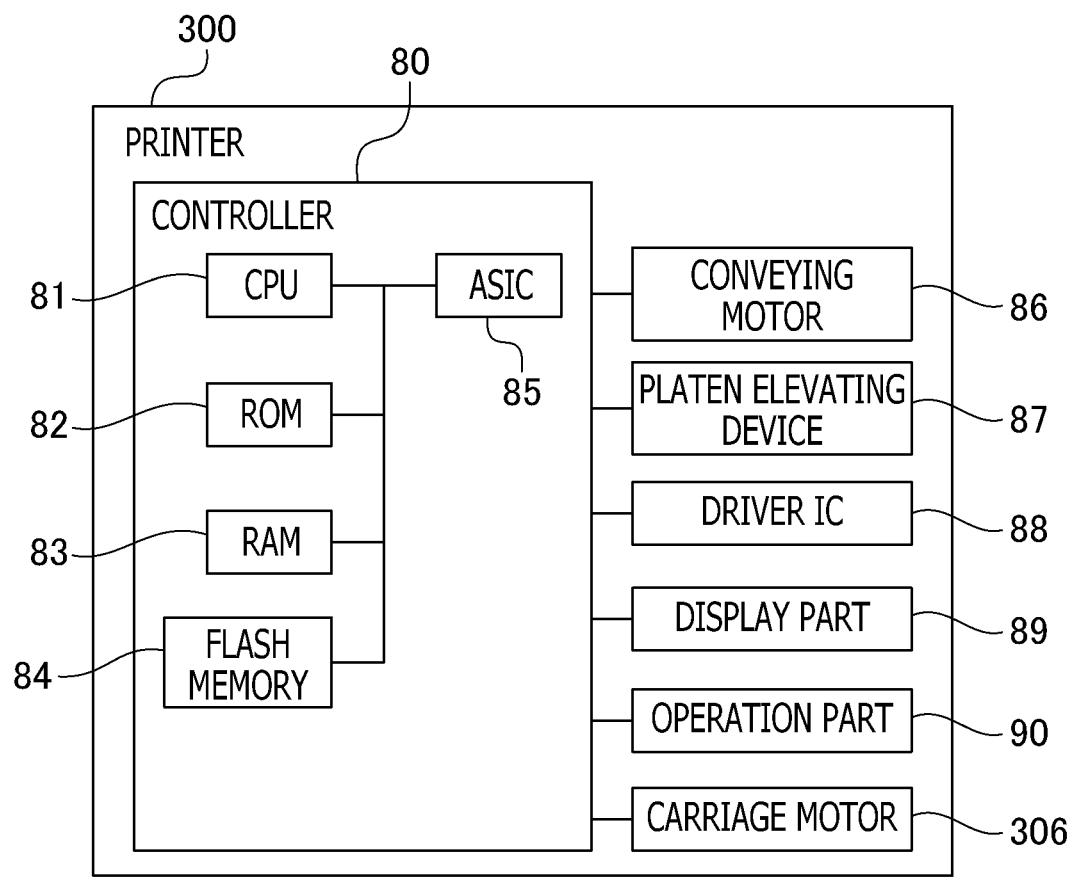
FIG. 13 is a block diagram showing an electrical configuration of the printer according to the fifth embodiment of the present disclosure.

The carriage 301 is positioned above the platen 3 between the conveying roller 4 and the conveying roller 5 in the conveying direction. The carriage 301 is supported by two guide rails 303 and 304 extending in the sheet-width direction. As shown in FIG. 13, the printer 300 also includes a carriage motor 306. The carriage 301 is connected to the carriage motor 306 via a conventionally known belt and the like. As the carriage motor 306 is driven, the carriage 301 moves along the guide rails 303 and 304 in the sheet-width direction. By this configuration, the inkjet head 302 mounted on the carriage 301 and the recording sheet P on the platen 3 relatively displace in the sheet-width direction.

The inkjet head 302 is mounted on the carriage 301. The inkjet head 302 is similar to the head unit 6 of the printer 1 according to the first embodiment. However, in the inkjet head 302, the plurality of nozzles 10 forming the nozzle rows 9 are arranged such that the arrangement direction becomes parallel to the conveying direction.

Control for Recording Bar Code or Two-Dimensional Code

Figure 14:
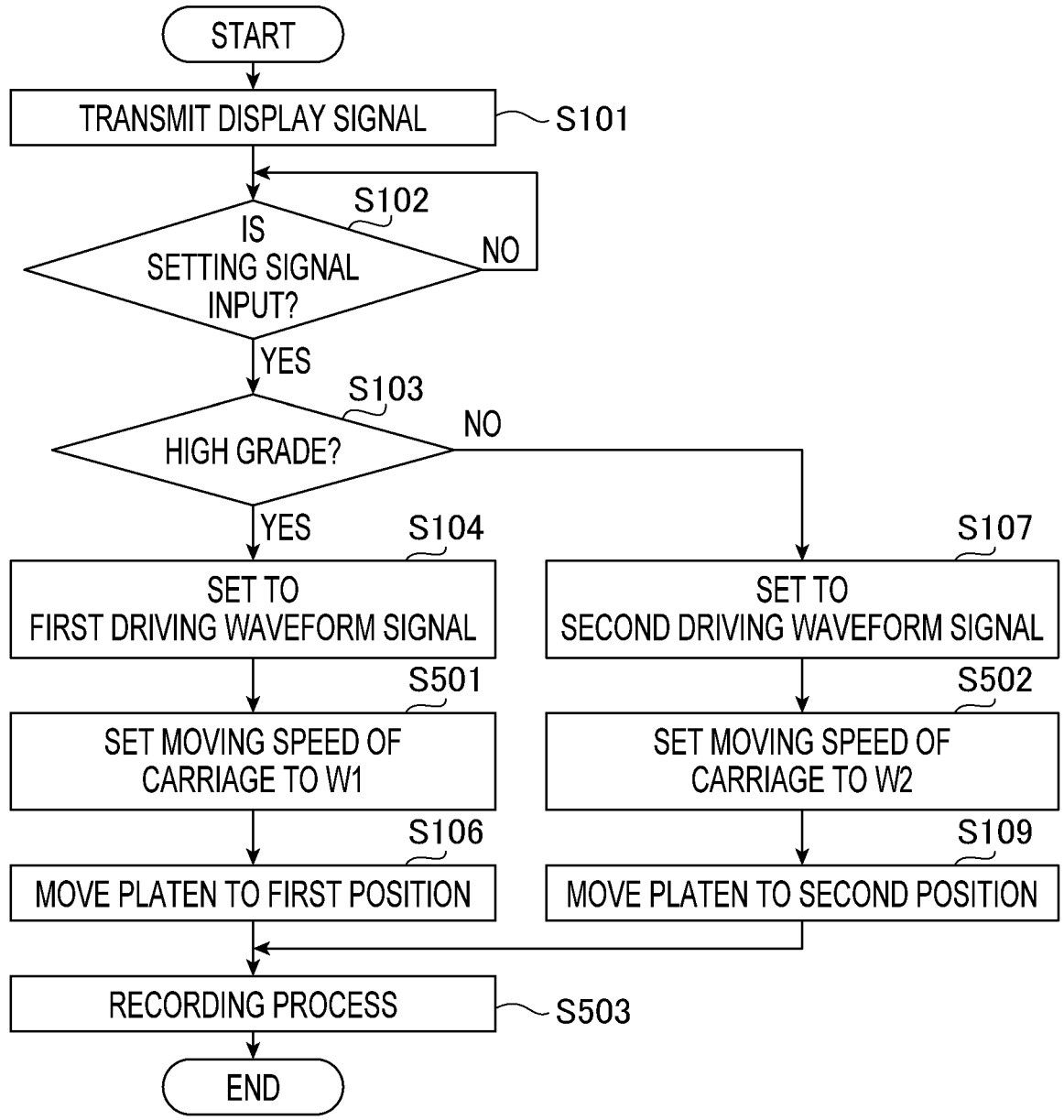
FIG. 14 is a flowchart showing a flow of processes to be executed by the printer according to the fifth embodiment of the present disclosure when recording a barcode or two-dimensional code.

In the printer 300, upon input of a recording command instructing to execute recording of a barcode or two-dimensional code, the controller 80 executes processes in accordance with a flow shown in FIG. 14.

When the recording command instructing to execute recording of a barcode or two-dimensional code is input, as with the first embodiment, the controller 80 executes the processes of S101 to S103.

Then, if the signal indicating the "high grade" is input (S103: YES), as with the first embodiment, the controller 80 sets the driving waveform signal for the recording to the first driving waveform signal (S104). In accordance with this setting, the controller 80 sets a moving speed of the carriage to W1 (e.g., 50 to 150 mm/sec) (S501). In other words, the controller 80 sets a rotation speed of the carriage motor 306 such that the moving speed of the carriage 301 becomes W1. Furthermore, as with the first embodiment, the controller 80 controls the platen elevating device 87 to move the platen 3 to the first position (S106). It should be noted that the processes of S104, S501 and S106 may be executed in orders different from the one shown in FIG. 14 or may be executed in parallel.

On the other hand, if the signal indicating the "low grade" is input (S103: NO), as with the first embodiment, the controller 80 sets the driving waveform signal for the recording to the second driving waveform signal (S107). In accordance with this setting, the controller 80 sets the moving speed of the carriage 301 to W2 (e.g., 150 to 250 mm/sec) being faster than W1 (S502). In other words, the controller 80 sets the rotation speed of the carriage motor 306 such that the moving speed of the carriage 301 becomes W2. Furthermore, as with the first embodiment, the controller 80 controls the platen elevating device 87 to move the platen 3 to the second position (S109). It should be noted that the processes of S107, S502 and S109 may be executed in orders different from the one shown in FIG. 14 or may be executed in parallel.

After completion of the processes of S104, S501 and S106 or the processes of S107, S502 and S109, the controller 80 executes a recording process (S503). In the recording process of S503, the controller 80 records a barcode or two-dimensional code on the recording sheet P by alternatingly executing a recording pass process and a conveying process. In the recording pass process, the controller 80 controls the carriage motor 306 to cause the carriage 301 to move in the sheet-width direction at the speed set at S501 or S502 and, at the same time, controls the driver IC 88 to output the driving waveform signal set at S104 or S107 to the plurality of individual electrodes 64 based on image data of a barcode or two-dimensional code input along with the recording command to eject ink from the plurality of nozzles 10 of each head unit 6. In the conveying process, the controller 80 controls the conveying motor 86 to cause the conveying rollers 4 and 5 to convey the recording sheet P for a predetermined distance.

Effects of Fifth Embodiment

In the fifth embodiment, when a user is desiring a barcode or two-dimensional code of a high grade and a setting signal indicating the "high grade" is input, the head unit 6 is driven using the first driving waveform signal which makes the ejection speed of ink from the nozzle 10 slow and which makes the volume of an ink droplet ejected from the nozzle 10 small. In addition, in accordance with the slow ejection speed of ink from the nozzle 10, the moving speed of the carriage 301 during the recording pass is set to W1. With this configuration, although productivity of the printer 300 decreases to a certain extent, it is possible to record barcodes or two-dimensional codes of high grades.

On the other hand, when a user is not desiring a barcode or two-dimensional code of a high grade and a setting signal indicating the "low grade" is input, the head unit 6 is driven using the second driving waveform signal which makes the ejection speed of ink from the nozzle 10 fast and which makes the volume of an ink droplet ejected from the nozzle 10 large. In addition, in accordance with the fast ejection speed of ink from the nozzle 10, the moving speed of the carriage 301 during the recording pass is set to W2 that is faster than W1. With this configuration, it is possible to improve productivity of the printer 300 by reducing time necessary to record a barcode or two-dimensional code with the printer 300.

Sixth Embodiment

Next, the sixth embodiment of the present disclosures will be described.

Configuration of System Including Printer 400

Figure 15:
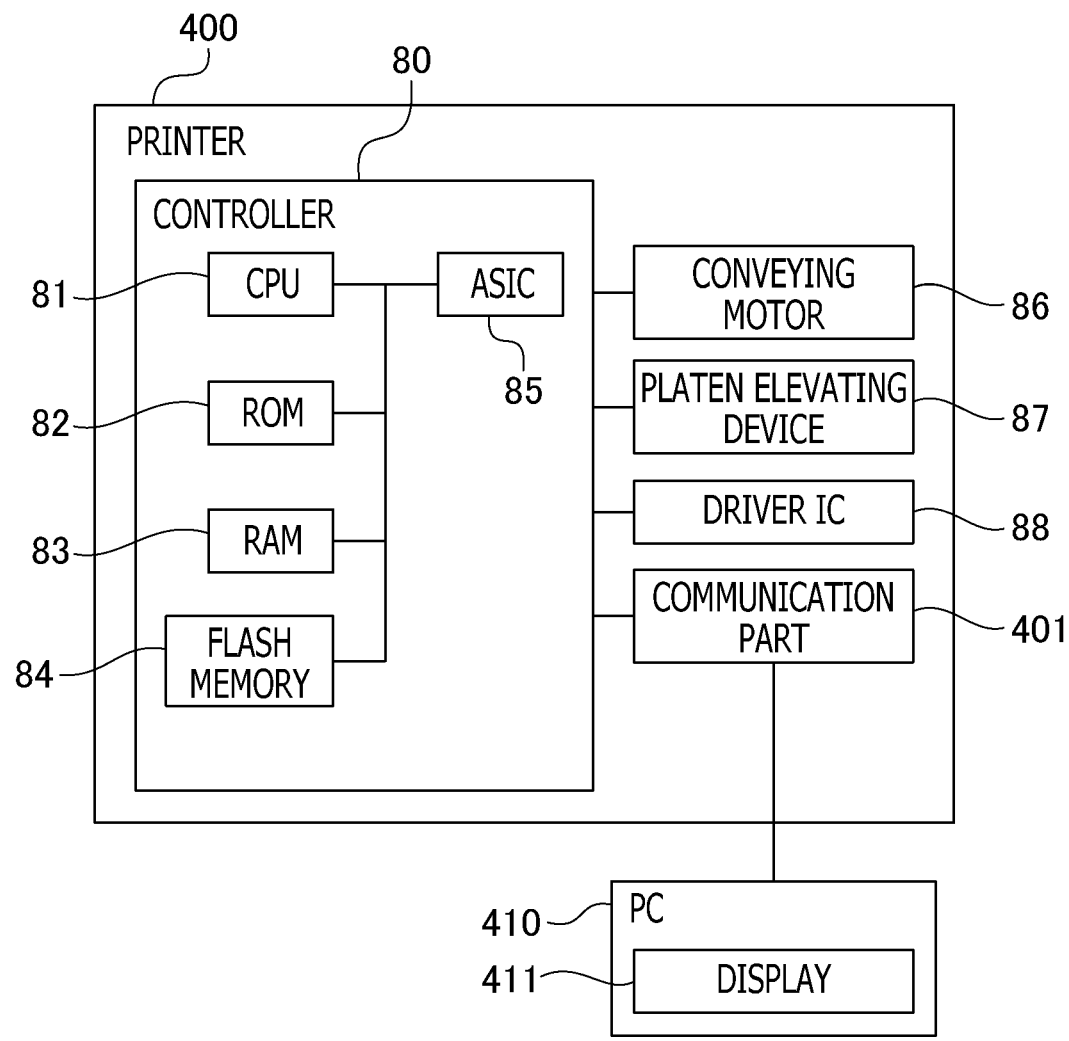
FIG. 15 is a block diagram showing an electrical configuration of a system including a printer according to a sixth embodiment of the present disclosures.

As shown in FIG. 15, a printer 400 according to the sixth embodiment includes a communication part 401. The communication part 401 is connected to a PC 410 being an external device, that is, a device separate from the printer 400. The PC 410 includes a display 411. It is noted that the PC 410 is an example of a device separate from the recording device according to aspects of the present disclosures, and the display 411 is an example of a display part according to aspects of the present disclosures. The sixth embodiment will be described on the premise that the PC 410 is a PC, such as a laptop PC, which includes the display 411. However, the printer 400 may be connected to a PC, such as a desktop PC, which is connected to a separate display. It is noted that a combination of the PC and the separate display is an example of the device separate from the recording device according to aspects of the present disclosures, and the separate display is an example of the display part according to aspects of the present disclosures.

Control for Recording Bar Code or Two-Dimensional Code

In the printer 400, upon input of a recording command instructing to execute recording of a barcode or two-dimensional code, the controller 80 executes processes in accordance with one of the flows shown in FIGS. 5, 8, 10, 11 and 14 of the first to fifth embodiments. However, in the sixth embodiment, unlike the first to fifth embodiments, at S101, the controller 80 transmits, to the PC 410, a display signal for causing the display 411 to display the setting screen 70. Furthermore, at S102, the controller 80 determines whether the signal of setting information is input from the PC 410 to the controller 80 through the communication part 401. It is noted that the communication part 401 is an example of the signal input part according to aspects of the present disclosures.

Effects of Sixth Embodiment

In the sixth embodiment, a user can perform the above-described settings while confirming information concerning the smallest width and information concerning the grade by looking at the setting screen 70 displayed on the display 411 of the PC 410 connected to the printer 400.

Variations

The first to sixth embodiments of the present disclosures have been described. However, the present disclosures are not limited to the first to sixth embodiments but various modification are possible within the scope of the technical ideas described herein.

In the first to sixth embodiments, the gap between the nozzle surface 6a and the recording sheet on the platen 3 is changed by moving the platen 3 up and down using the platen elevating device 87. However, for example, the head unit 6 or the inkjet head 302 may be configured to be movable up and down and the gap may be changed by moving the head unit 6 or the inkjet head 302 up and down. It is noted that a configuration for moving the head unit 6 or the inkjet head 302 up and down is an example of the gap changing unit according to aspects of the present disclosures.

The gap may also be changed by moving both the platen 3 and the head unit 6 or the inkjet head 302 up and down. it is noted that a combination of the platen elevating device 87 and the configuration for moving the head unit 6 or the inkjet head 302 up and down is an example of the gap changing unit according to aspects of the present disclosures.

In the first to fifth embodiments, the gap between the nozzle surface 6a and the recording sheet P on the platen 3 is changed in accordance with a relative displacement speed between the nozzle surface 6a and the recording sheet P (i.e., the conveying speed of the recording sheet P in the first to fourth embodiments and the moving speed of the carriage 301 in the fifth embodiment). However, the gap may be constant regardless of the relative displacement speed between the nozzle surface 6a and the recording sheet P.

In the second embodiment, the higher the driving voltage, the faster the rotation speed of the cooling fan 101 is made. However, for example, in the second embodiment, the rotation speed of the cooling fan 101 may be constant regardless of the driving voltage.

In the third embodiment, the higher the driving voltage, the faster the rotation speed of the pump 203 is made. However, for example, in the third embodiment, the rotation speed of the pump 203 may be constant regardless of the driving voltage.

In the configuration in which the driving voltage is to be changed in accordance with the grade of a barcode or two-dimensional code to be recorded as in the second and third embodiments, configurations for cooling the head units 6 such as the cooling fan 101 of the second embodiment and the cooling flow path 202 and the pump 203 of the third embodiment needs not necessarily be provided.

In the first, second, third and fifth embodiments, the relative displacement speed between the nozzle surface 6a and the recording sheet P is changed in accordance with the change in the driving wavelength signal and/or the driving voltage. However, for example, the ejection speed of ink from the nozzle 10 may be changed by changing factors other than the driving waveform signal and the driving voltage, and the relative displacement speed between the nozzle surface 6a and the recording sheet P may be changed in accordance with the ejection speed of ink.

For example, there are cases where, when the driving waveform signal and/or the driving voltage is changed, the volume of an ink droplet ejected from the nozzle 10 changes but the ejection speed of ink from the nozzle 10 does not change. In such cases, the relative displacement speed between the nozzle surface 6a and the recording sheet P may be constant regardless of the driving waveform signal and/or the driving voltage.

In the fifth embodiment, as with the first embodiment, the driving waveform signal for when the signal indicating the "high grade" is input and the driving waveform signal for when the signal indicating the "low grade" is input are different. However, in the fifth embodiment, as with the second and third embodiments, the driving voltage for when the signal indicating the "high grade" is input and the driving voltage for when the signal indicating the "low grade" is input may be made different, or, as with the fourth embodiment, the driving frequency of the inkjet head 302 for when the signal indicating the "high grade" is input and the driving frequency of the inkjet head 302 for when the signal indicating the "low grade" is input may be made different.

In the first to sixth embodiments, it is possible to set the smallest width of elements of a barcode or two-dimensional code on the setting screen 70 and, in relation to this configuration, the message 72c indicating that the grade of a barcode or two-dimensional code will be set to the "high grade" if the smallest width of elements of a barcode or two-dimensional code is set to a width that is smaller than the smallest width defined by a regulation of a barcode or two-dimensional code is displayed on the setting screen 70. However, other messages notifying a user of settings for making the grade of a barcode or two-dimensional code predetermined grades may be displayed on the setting screen 70.

For example, a message indicating that the grade of a barcode or two-dimensional code will be set to the "low grade" if the smallest width of elements of a barcode or two-dimensional code is set to a width that is equal to or greater than a smallest width defined in a regulation may be displayed on the setting screen 70.

Also, for example, the setting screen 70 may be configured such that a recording speed can be set and, in relation to this configuration, a message indicating that the grade of a barcode or two-dimensional code will be set to the "high grade" if the recording speed is set to a speed that is slower than a predetermined speed may be displayed on the setting screen 70.

Alternatively, the setting screen 70 may not have a portion for notifying a user of settings for making the grade of a barcode or two-dimensional code predetermined grades.

In the first to sixth embodiments, the correlation information indicating correlation between the smallest widths of elements of a barcode or two-dimensional code and the grades of a barcode or two-dimensional code is stored in the flash memory 84. Based on this information, in the setting screen 70, the setting of the grade of a barcode or two-dimensional code at the grade setting part 71 (i.e., the cursor 71*a*) and the setting of the smallest width of elements of a barcode or two-dimensional code at the smallest width setting part 72 (i.e., the cursor 72*b*) are linked.

However, for example, correlation information indicating correlation between one or more other settings, other than the smallest width setting, related to the grade of a barcode or two-dimensional code and the grades of a barcode or two-dimensional code may be stored in the flash memory 84. In association with this configuration, the setting screen 70 may have a setting display part for setting the above-mentioned one or more other settings in place of the smallest width setting part 72 and, based on the above-mentioned correlation information, in the setting screen 70, the setting of the grade of a barcode or two-dimensional code at the grade setting part 71 and the setting of the above-mentioned one or more other settings at the setting display part may be linked.

Alternatively, the setting screen 70 may be configured such that only a direct setting of the grade of a barcode or two-dimensional code can be performed.

In the above-described embodiments, only one of the driving waveform signal, the driving voltage and the driving frequency is changed in accordance with the grade of a barcode or two-dimensional code. However, two or more of the driving waveform signal, the driving voltage and the driving frequency may be changed in accordance with the above-mentioned grade.

Furthermore, factors other than the driving waveform signal, the driving voltage and the driving frequency may be changed to record a barcode or two-dimensional code of a set grade.

In the above-described embodiments, the grade of a barcode or two-dimensional code can be set in two stages, namely, the "high grade" and the "low grade." However, the grade of a barcode or two-dimensional code can be set in three or more stages. In relation to this configuration, the driving waveform signal, the driving voltage and the driving frequency may also be changed in three or more stages in accordance with a set grade.

Aspects of the present disclosures has been described by taking a printer configured to perform recording by ejecting ink from nozzles as an example. However, aspects pf the present disclosures can be applied to recording devices configured to perform recording by ejecting liquid other than ink.

What is claimed is:
1. A recording apparatus comprising:
a liquid ejection head having nozzles and a nozzle surface to which the nozzles are formed;
a controller;
a signal input part through which a user inputs, to the controller, a setting signal indicating settings related to a grade of a barcode or two-dimensional code; and
a gap changing unit configured to change a gap between the nozzle surface and a recording medium by relatively displacing the liquid ejection head and a recording medium in a direction intersecting with the nozzle surface,
wherein the controller drives the liquid ejection head based on the setting signal input through the signal input part to cause the nozzles to eject liquid to record a barcode or two-dimensional code on the recording medium in the grade corresponding to the setting signal,
wherein the recording apparatus includes a relative displacement unit configured to cause the liquid ejection head and the recording medium to relatively displace in a direction parallel to the nozzle surface, and
wherein the controller:
performs the setting including a setting related to an ejection speed of liquid from the nozzles based on the setting signal input through the signal input part;
controls the relative displacement unit to cause the liquid ejection head and the recording medium to relatively displace and, at the same time, drives the liquid ejection head based on the setting to eject liquid from the nozzles to record a barcode or two-dimensional code on the recording medium;
makes a relative displacement speed between the liquid ejection head and the recording medium by the relative displacement unit faster as the liquid ejection speed corresponding to the setting signal gets faster; and
controls the gap changing unit to select a size of a platen gap between the nozzle surface and the recording medium based on the relative displacement speed, including making the platen gap size greater as the relative displacement speed between the liquid ejection head and the recording medium by the relative displacement unit gets faster.

2. The recording apparatus according to claim 1,
wherein the controller:
sets a driving waveform signal for driving the liquid ejection head based on the setting signal input through the signal input part; and
drives the liquid ejection head using the set driving waveform signal to cause the nozzles to eject liquid to record a barcode or two-dimensional code on a recording medium in the grade corresponding to the setting signal.

3. The recording apparatus according to claim 1,
wherein the controller:

sets a driving voltage to be applied to the liquid ejection head based on the setting signal input through the signal input part; and applies the set driving voltage to the liquid ejection head to cause the nozzles to eject liquid to record a barcode or two-dimensional code on a recording medium in the grade corresponding to the setting signal.

4. The recording apparatus according to claim 3, comprising a cooling fan provided to the liquid ejection head, wherein the controller makes a rotation speed of the cooling fan faster as the driving voltage gets higher.

5. The recording apparatus according to claim 3, comprising:

a cooling flow path provided to the liquid ejection head and through which cooling liquid flows; and a pump connected to the cooling flow path, wherein the controller makes a rotation speed of the pump faster as the driving voltage gets higher.

6. The recording apparatus according to claim 1, wherein the controller:

sets a driving frequency of the liquid ejection head based on the setting signal input through the signal input part;

controls the relative displacement unit to cause the liquid ejection head and the recording medium to relatively displace and, at the same time, drives the liquid ejection head at the set driving frequency to eject liquid from the nozzles to record a barcode or two-dimensional code on the recording medium; and makes a relative displacement speed between the liquid ejection head and the recording medium by the relative displacement unit faster as the driving frequency gets higher.

7. The recording apparatus according to claim 1, comprising a storage configured to store correlation information indicating correlation between the setting and the grade, wherein the controller is configured to transmit a display signal for causing a display part to display a setting screen for performing the setting, the setting screen including a setting display part configured to display information concerning the setting and a grade display part configured to display information concerning the grade and being configured such that the information concerning the setting displayed on the setting display part and the information concerning the grade displayed on the grade display part are linked based on the correlation information.

8. The recording apparatus according to claim 7, wherein the controller is configured to output the display signal for causing the display part to display the setting screen further including a notifying part configured to notify a user of the setting for making the grade a predetermined grade.

9. The recording apparatus according to claim 8, wherein the setting includes a setting of a smallest width of elements of a barcode or two-dimensional code, and wherein the correlation information includes information indicating that the grade will be set to the one with which a reading accuracy by a reader becomes equal to or higher than a predetermined accuracy if the smallest width of the elements of a barcode or two-dimensional code is set to a width that is smaller than a smallest width defined in a regulation of a barcode or two-dimensional code.

10. The recording apparatus according to claim 7, comprising the display part.

11. The recording apparatus according to claim 7, wherein the controller is configured to output the display signal to a device separate from the recording apparatus which is connected to the recording apparatus and which comprises the display part.

* * * * *

UNITED STATES PATENT AND TRADEMARK OFFICE
CERTIFICATE OF CORRECTION

PATENT NO. : 11,745,505 B2
APPLICATION NO. : 17/174659
DATED : September 5, 2023
INVENTOR(S) : Shotaro Kanzaki It is certified that error appears in the above-identified patent and that said Letters Patent is hereby corrected as shown below:

In the Claims

Column 20, Claim 1, Lines 21-22:
Please delete "a recording medium" and insert --the recording medium--

Signed and Sealed this
Twenty-first Day of November, 2023

Katherine Kelly Vidal
*Director of the United States Patent and Trademark Office*